(12) United States Patent
Upstone et al.

(10) Patent No.: US 11,157,947 B2
(45) Date of Patent: Oct. 26, 2021

(54) SYSTEM AND METHOD FOR REAL-TIME OPTIMIZATION AND INDUSTRY BENCHMARKING FOR CAMPAIGN MANAGEMENT

(71) Applicant: LoopMe Ltd, London (GB)

(72) Inventors: Stephen Upstone, London (GB);
Marco Van De Bergh, Sustern (NL);
Leonard Newnham, London (GB)

(73) Assignee: LOOPME, LTD., London (GB)

( * ) Notice: Subject to any disclaimer, the term of this patent is extended or adjusted under 35 U.S.C. 154(b) by 342 days.

(21) Appl. No.: 15/679,054

(22) Filed: Aug. 16, 2017

(65) Prior Publication Data

US 2018/0053208 A1 Feb. 22, 2018

Related U.S. Application Data

(60) Provisional application No. 62/375,864, filed on Aug. 16, 2016.

(51) Int. Cl.
*G06Q 30/02* (2012.01)
*G06N 7/00* (2006.01)
*G06N 20/00* (2019.01)

(52) U.S. Cl.
CPC .......... *G06Q 30/0245* (2013.01); *G06N 7/00* (2013.01); *G06N 20/00* (2019.01); *G06Q 30/0214* (2013.01)

(58) Field of Classification Search
CPC .................. G06Q 30/0204; H04L 67/025
USPC ................ 725/24; 705/7.32, 14.41; 455/418
See application file for complete search history.

(56) References Cited

U.S. PATENT DOCUMENTS

| | | | |
|---|---|---|---|
| 2008/0091510 A1* | 4/2008 | Crandall | G06Q 30/0204 705/7.32 |
| 2009/0076890 A1* | 3/2009 | Dixon | G06Q 30/02 705/14.41 |
| 2010/0203876 A1* | 8/2010 | Krishnaswamy | H04L 67/025 455/418 |
| 2013/0014153 A1* | 1/2013 | Bhatia | H04N 21/252 725/24 |
| 2014/0143017 A1* | 5/2014 | Kannan | G06Q 30/0203 705/7.32 |
| 2014/0358636 A1* | 12/2014 | Nowak | G06Q 50/01 705/7.32 |
| 2017/0195452 A1* | 7/2017 | Zhao | G06Q 50/01 |

* cited by examiner

*Primary Examiner* — Saba Dagnew
(74) *Attorney, Agent, or Firm* — Orrick, Herrington & Sutcliffe LLP

(57) ABSTRACT

A system for collecting brand awareness and advertising campaign performance results in real-time. Embodiments allow the system to adapt (e.g., machine learning) to target advertisements to users that are most likely to be influenced by exposure to a brand awareness advertising campaign, and present results, in real-time, via a data exchange for an advertiser to monitor performance and benchmark performance against similar campaigns across the industry.

16 Claims, 23 Drawing Sheets

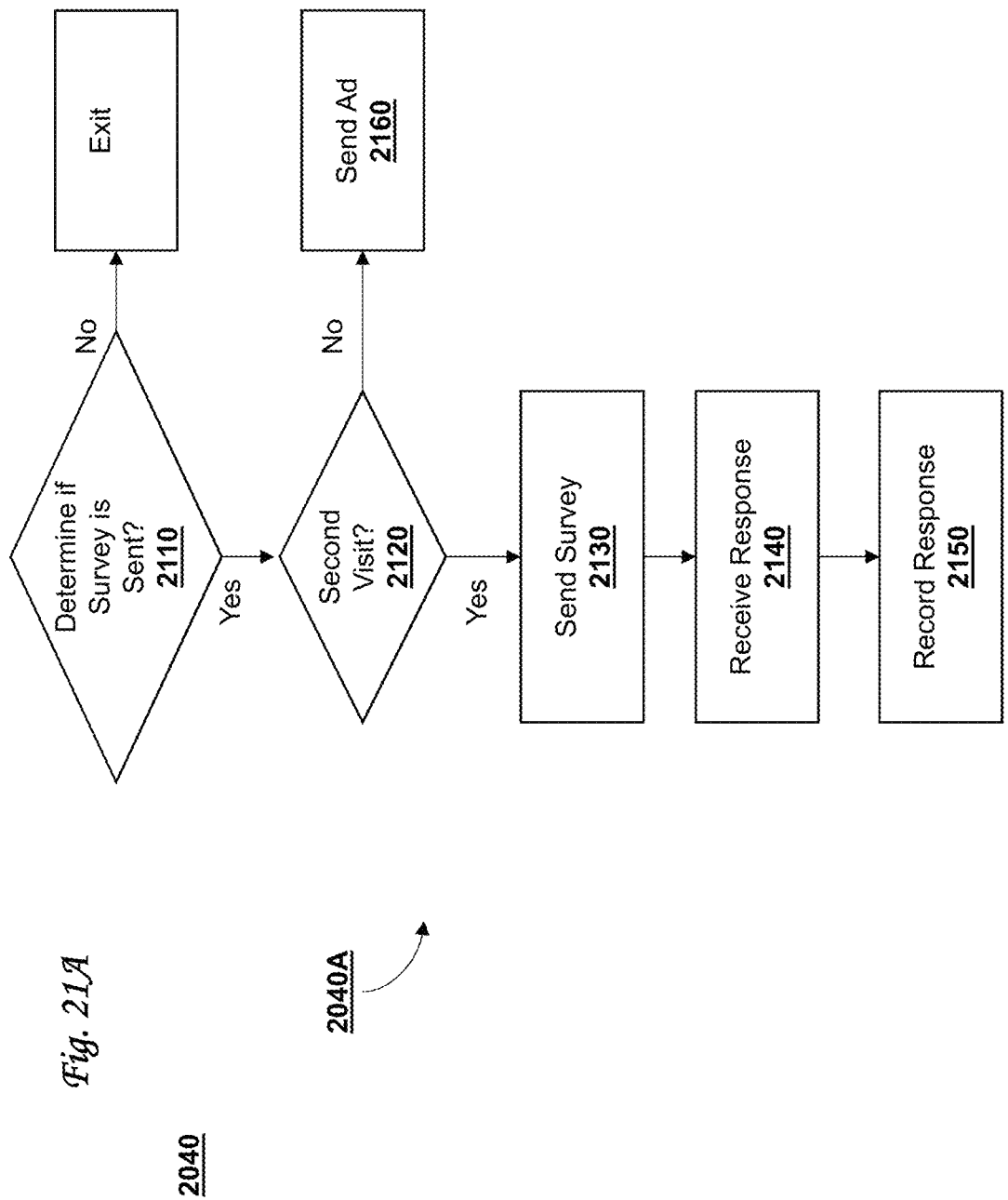

SYSTEM AND METHOD FOR REAL-TIME OPTIMIZATION AND INDUSTRY BENCHMARKING FOR CAMPAIGN MANAGEMENT

CROSS-REFERENCE TO RELATED APPLICATIONS

This application claims the benefit of U.S. Provisional Application No. 62/375,864, filed Aug. 16, 2016, which application is hereby incorporated herein by reference in its entirety and for all purposes. This application is also a continuation-in-part of U.S. patent application Ser. No. 14/409,709, which was filed Dec. 19, 2014 as a national phase entry of PCT Application No. IB2013/001297 that claims the benefit of U.S. Provisional Application No. 61/662,262, filed Jun. 20, 2012, which applications are hereby incorporated herein by reference in their entirety and for all purposes.

FIELD

The present disclosure relates generally to advertising and more particularly, but not exclusively, to systems and methods for real-time optimization and industry benchmarking for campaign management.

BACKGROUND

Consumers are inundated with various types of advertising content on television, mobile devices, and while accessing the internet, but typically lack the ability to actively control and interact with such advertising content. For example, consumers are conventionally served with advertising content, regardless of whether the user would have an interest in the content. Accordingly, a large majority of advertising is wasted on viewers who have no interest in the goods or services being advertised, or would not be eligible buyers for such goods and services.

Additionally, consumers lack the ability to provide feedback about advertising content or about the goods or services being advertised. Unfortunately, advertisers are therefore unable to determine which advertising campaigns are more successfully engaging consumers, and are unable to provide personalized and more relevant advertising content to consumers. Moreover, advertisers are unable to reward consumers for providing valuable feedback regarding advertising content.

Many consumers also desire to share advertising content with friends because they may enjoy the content, or because they may like the products or services being advertised. Conventional advertising can be difficult to share among friends, and there is no way to track, incentivize and reward consumers who share advertising with their friends. Additionally, there is no way to provide sharing consumers with further rewards and incentives for having friends purchase goods or services associated with advertising content or for sharing consumers to leverage the buying power of a group of users to receive rewards and incentives.

Conventional advertising also fails to allow consumers to socially discover and search for advertising based on feedback of friends and other users, nor does conventional advertising provide for discovery of advertising that is promoted, disliked or shared by enthusiasts, experts, friends or celebrities.

Furthermore, the effectiveness of brand and similar advertising is typically evaluated by surveys sent to a consumer panel once the advertising campaign has terminated. The surveys are designed to measure the nebulous quantity of brand awareness. Some members of the consumer panel are exposed to the advertising; and some members of the consumer panel are not. The difference in survey results from these two groups forms the basis of the analysis of effectiveness. However, evaluating the campaign after a single iteration of the campaign is inaccurate.

For example, targeting advertisements automatically relies on a prediction of the value of displaying the advertisement to any individual based on examples of high and low value users. This information is not available until the survey has been conducted, making automated targeting of brand advertisements is very difficult. Typically, unsatisfactory surrogates for the value of displaying an advertisement to a particular user (e.g., clicks or video completes) are used, and the correlation between these and the subsequent survey results can be very weak.

As an additional drawback, external factors (e.g., major news stories regarding food safety) can affect the survey results during the time the campaign ends and the survey questions are sent. Additionally, brand awareness generally decreases over time after the advertisement campaign is viewed. Accordingly, the time between exposure to the campaign and the survey can affect the effectiveness of the campaign. The lack of a standardized framework makes it very difficult for an advertiser to compare the effectiveness of a campaign against the norm across similar industries—or even the advertiser's own historical campaigns.

In view of the foregoing, a need exists for improved systems and methods for collecting brand awareness and advertising campaign performance results in real-time, in an effort to overcome the aforementioned obstacles and deficiencies of conventional user account registration systems.

BRIEF DESCRIPTION OF THE DRAWINGS

FIG. 21A is an exemplary data flow diagram illustrating an embodiment of a data flow path for the survey logic of FIG. 20 where the survey logic is configured to "next-time-same-user-seen".

Figure 1:
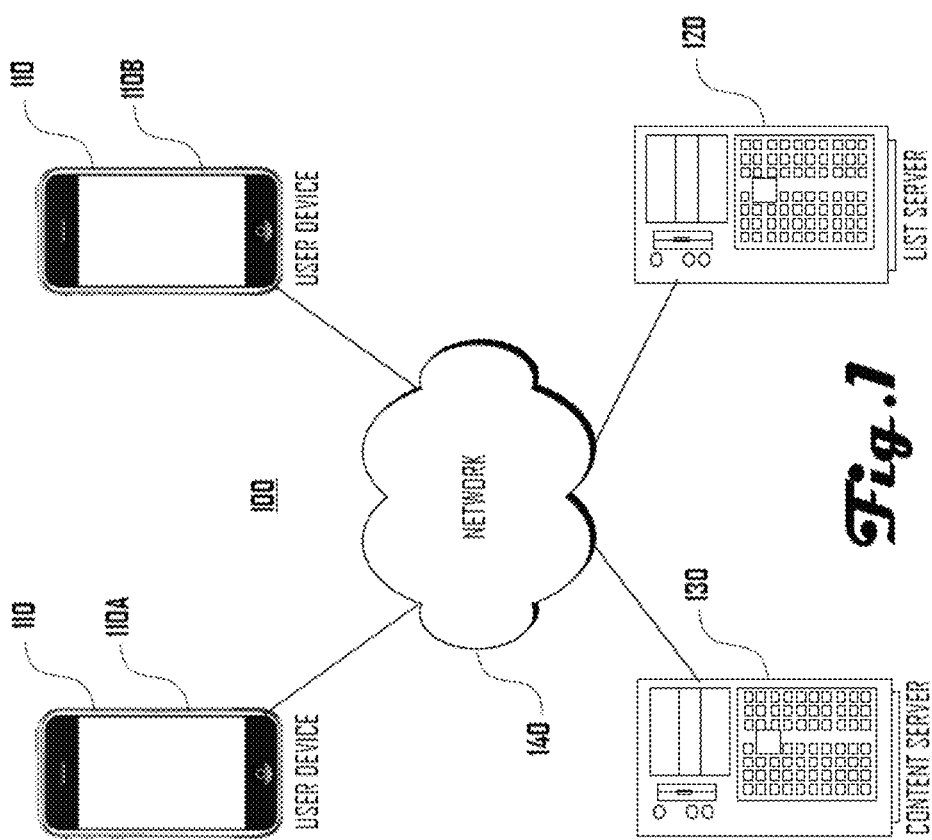
FIG. 1 is an exemplary top-level block diagram illustrating an embodiment of a content feedback, incentive, and reward system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available user account systems fail to effectively provide for advertising content feedback, incentives and rewards, a system that provides for such functionalities can prove desirable and provide a basis for a wide range of applications, such as providing a personalized presentation of advertising content, providing the ability to easily provide feedback regarding advertising content, sharing advertising content with friends, and receiving incentives and/or rewards for providing feedback, sharing content, and having friends purchase goods or services related to advertising content, or the like. Such results can be achieved, according to one embodiment disclosed herein, by a system 100 as illustrated in FIG. 1.

Turning to FIG. 1, the system 100 is shown as including at least one user device 110. As an example, FIG. 1 depicts a first and second user device 110A, 110B, a list server 120 and a content server 130 that are operably connected via a network 140.

The user devices 110, servers 120, 130, and network 140 each can be provided as conventional communication devices of any type. For example, the user devices 110A, 110B may be smart-phones as depicted in FIG. 1; however, in various embodiments, the user devices 110A, 110B may be various suitable devices including a tablet computer, laptop computer, desktop computer, gaming device, or the like without limitation. The user devices 110 also may include uniform and/or different devices. In other words, two user devices may be smart phones, but a third device could be a laptop computer.

Additionally, the servers 120, 130 may be any suitable device, may comprise a plurality of devices, or may be a cloud-based data storage system. As discussed in further detail herein, servers 120, 130 may be operated by the same company or group, or may be operated by different companies or groups. In various embodiments, the network 140 may comprise one or more suitable wireless or wired networks, including the Internet, a local-area network (LAN), a wide-area network (WAN), or the like.

In various embodiments, there may be a plurality of any of the user devices 110, the list server 120, and/or the content server 130. For example, in an embodiment, there may be a plurality of users that are associated with one or more user devices 110, and the users (via user devices 110) and list server 120 may communicate with or interact with a plurality of content servers 130.

Although embodiments described herein include actions performed by the list server 120 or content server 130, in some embodiments any of these described actions may be performed by either of the list server 120 or content server 130. Additionally, in further embodiments, the list server 120 and content server 130 may be the same server.

As discussed in further detail herein, the user devices 110A, 110B, the list server 120, and the content server 130, can intercommunicate to achieve functionalities such as providing advertisement feedback, incentives, rewards, and the like.

Figure 2:
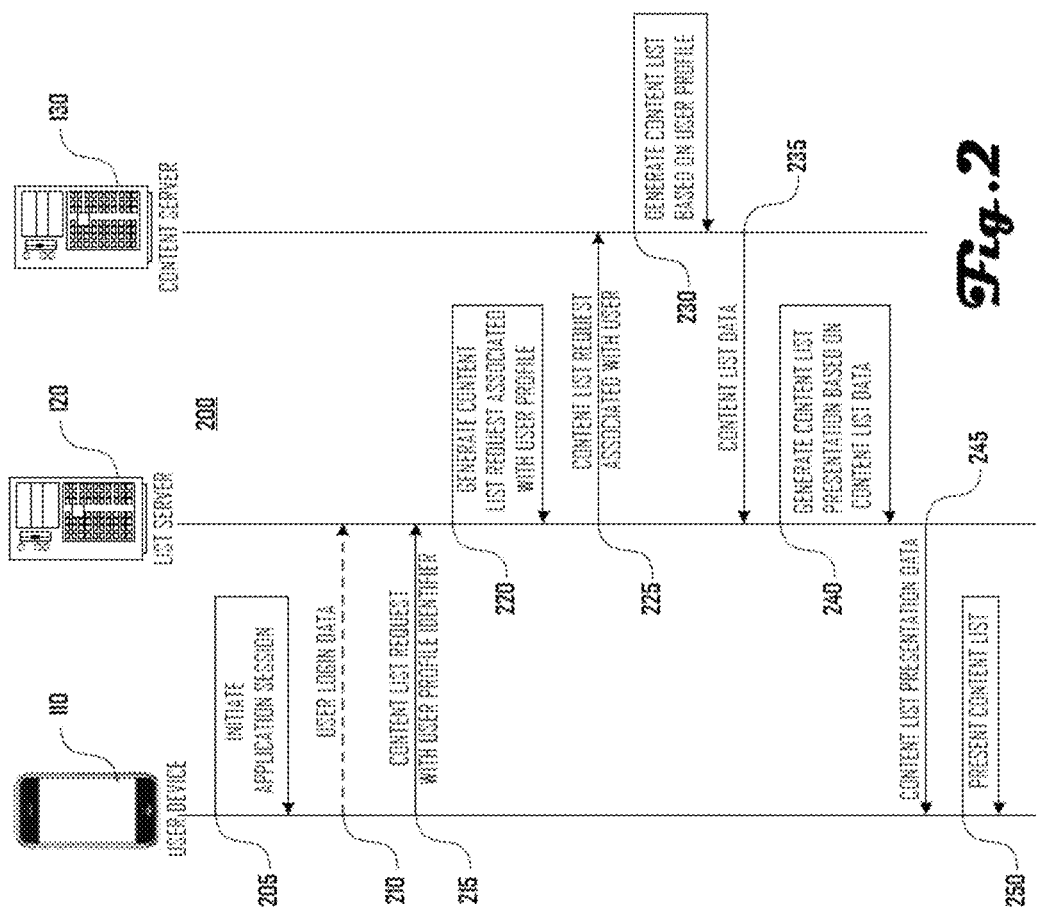
FIG. 2 is an exemplary data flow diagram illustrating an embodiment of a data flow path between a user device, the list server and content server of FIG. 1, in which a content list is generated and presented.

FIG. 2 is an exemplary data flow diagram illustrating an embodiment of a data flow path 200 between a user device 110, the list server 120 and content server 130 of FIG. 1, in which a content list is generated and presented. The data flow path 200 begins where the user device 110 initiates an application session at 205, and at 210, in an optional step, login data is sent to the list server 120.

For example, the user device 110 may store and execute various software applications, which may be configured to present a user interface as discussed herein and which may be operable to facilitate any of the communications or functionalities described herein. Some embodiments may allow or require a user to log in to a user account or the like, which may include inputting a user name, a password, or the like.

Returning to the data flow path 200, at 215, a content list request associated with a user profile is sent to the list server

120, where a content list request is generated at 220, which is associated with the user profile. The content list request associated with the user profile is sent to the content server 130, at 225, where a content list is generated based on the user profile.

For example, in an embodiment, a user may want to receive an updated list of content as further described herein, and the application running on the user device may request an updated content list from the list server 120. The list server 120 may then communicate with one or more content server 130 to obtain a portion of the content list.

A content server 130 may store a plurality of user profiles, which may allow for personalized content lists to be generated for each user profile. For example, as described herein, a user may provide feedback regarding content, which may include positive or negative feedback regarding advertising content, positive or negative feedback regarding goods or services associated with advertising content, or the like.

Accordingly, in some embodiments, a content list may be generated based on user profile data. For example, user profile data may include content feedback, advertising content feedback, feedback related to goods and services; likes or dislikes of advertising content along with advertisement metadata (e.g., metadata indicating type of advertisement); user share actions, which may be related to advertisement metadata; user block actions, which may be related to advertisement metadata; and user save actions, which may related to advertisement metadata. Additionally, in some embodiments, a content list may be generated based on other user profile data which may include user biographical data, user location data, other user preference data, information in or related to other user accounts (e.g., Facebook, Twitter, LinkedIn), or the like.

User profile data or other data may be used to determine a user's propensity to interact with certain types of advertisements, types of advertisers, types of goods or services, or the like; may be used to determine a user preference of types of advertisements, types of advertisers, types of goods or services, or the like; may be used to determine a user's propensity to share types of advertisements, types of advertisers, types of goods or services, or the like; may be used to determine a user's propensity to endorse types of advertisements, types of advertisers, types of goods or services, or the like; may be used to determine a user's propensity to interact with certain types of advertisements, types of advertisers, types of goods or services, or the like based on endorsements or sharing from friends or other users.

In various embodiments, content may be selected based on user endorsement or "liking" of a given advertisement. For example, another user, which may include an associated "friend" user, unrelated user, enthusiast, expert or celebrity user, may endorse or "like" a given advertisement, and such advertisements may be selected as a portion of a content list.

Accordingly, various embodiments allow user profile data, or other data to be used to select and provide content tailored for each consumer that the consumer is more likely to have an affinity for in terms of the advertising vehicle, advertising content, goods and services advertised, persons or other entities associated with the advertising content, person or other entity that shared or endorsed the content, or the like.

In addition to receiving selected advertisements, a user may discover advertisements by searching for or browsing user profiles. For example, a user may view a user profile of an associated "friend" user, unrelated user, enthusiast, expert, celebrity user, or the like, and view a history of advertisements or other content that the user has liked, disliked, endorsed, or otherwise provided feedback on. Viewing such user profiles may be done via a user interface or software application described herein, or via a social network or other website in some embodiments.

Returning to the data flow path 200, content list data is sent to the list server 120 at 235 and a content list presentation is generated based on the content list data at 240. Content list presentation data is sent to the user device 110, at 245, and the user device 110 presents the content list, at 250.

In some embodiments, generating a content list presentation may include formatting content list data, selecting a content presentation order, removing one or more item from a content list. Generating a content list may also include adding or removing fields, metadata, or the like as discussed in further detail herein. In some embodiments, where content list data is received from a plurality of content servers 130, generating a content list may include combining, filtering, ordering, or otherwise formatting content list data received from a plurality of content servers 130.

Figure 3:
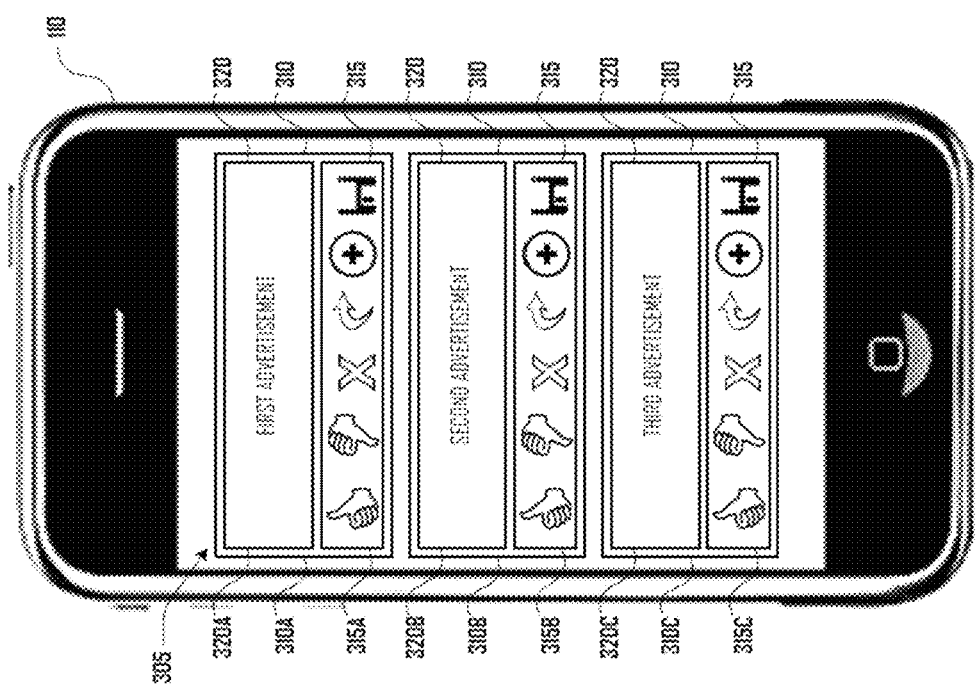
FIG. 3 depicts a user interface presenting a content list in accordance with an embodiment.

FIG. 3 depicts a user device 110 presenting a content list 305 in accordance with an embodiment. The content list includes a plurality of content items 310 (e.g., three content items 310A, 310B, 310C). Each content item includes an advertisement portion 320 (e.g., the three advertising portions 320A, 320B, 320C) and a content action portion 315 (e.g., the three content action portions 315A, 315B, 315C). The content action portion 315 may include one or more button that allows a user to provide positive or negative feedback about advertising portion 320; block an advertisement, company, or goods or services associated with an advertisement; discover similar advertisements, companies or goods or services associated with an advertisement; share an advertisement presented in the advertising portion 320; save an advertisement presented in the advertising portion 320; or the like.

The content action portion 315 may also present various suitable messages or data. For example, the content action portion may indicate a number of users that have provided positive feedback, negative feedback, saved content items, or the like. Additionally, the content action portion 315 may also indicate one or more user that has liked, endorsed, or provided positive feedback related to a given content item 310. For example, celebrity endorsements or "friend" user endorsements may be indicated.

Figure 4:
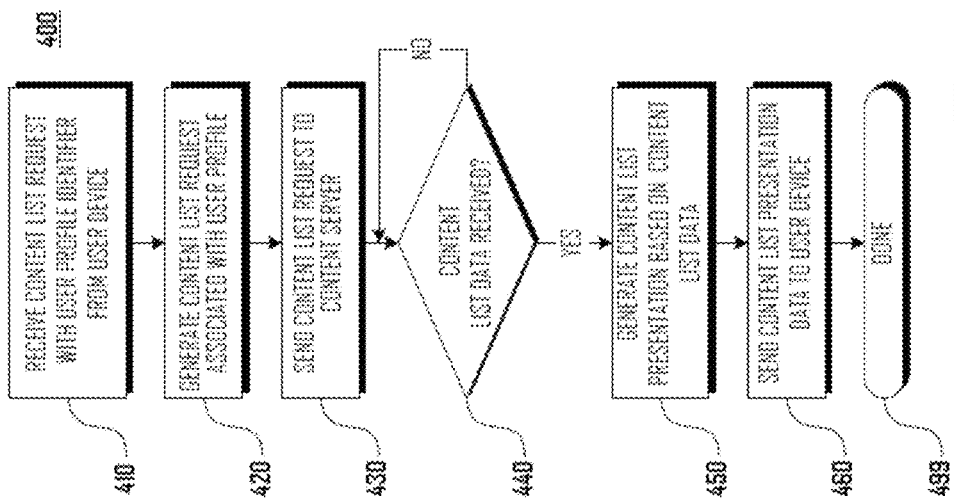
FIG. 4 is an exemplary flow chart illustrating an embodiment of a method executed by the list server of FIG. 1, for generating and providing a content list.

FIG. 4 is an exemplary flow chart illustrating an embodiment of a method 400 executed by the list server 120 of FIG. 1, for generating and providing a content list. The method 400 begins in block 410 where a content list request with a user profile identifier is received from a user device 110. In block 420, a content list request associated with the user profile is generated, and in block 430, the content list request is sent to the content server 130. In decision block 440, a determination is made whether content list data is received.

If content list data is not received, then the method 400 waits until content list data is received. However, if content list data is received, at 450, a content list presentation is generated based on the content list data, and at 460, the content list presentation data is sent to the user device 110. The method 400 is done in block 499.

Figure 5:
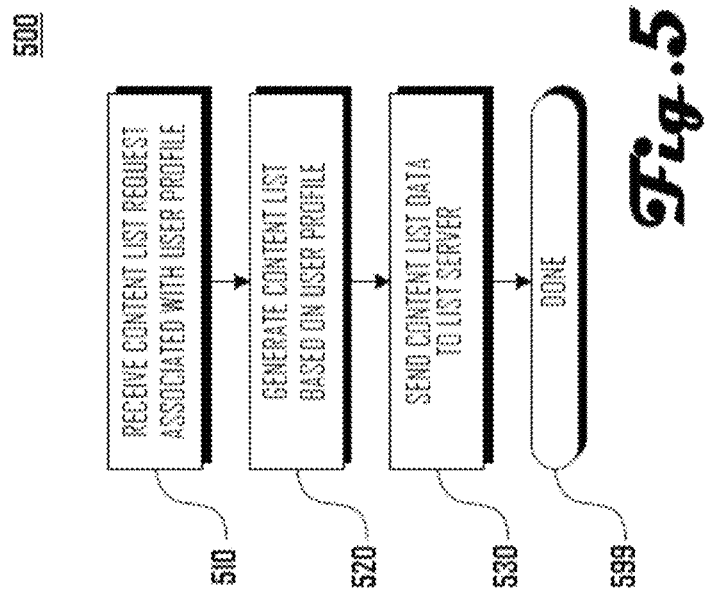
FIG. 5 is an exemplary flow chart illustrating an embodiment of a method executed by the content server of FIG. 1, for generating a content list.

FIG. 5 is an exemplary flow chart illustrating an embodiment of a method 500 executed by the content server 130 of FIG. 1, for generating a content list. The method 500 begins in block 510 where a content list request associated with a user profile is received from the list server 120. In block 520, a content list is generated based on the user profile, and in block 530, content list data is sent to the list server 120. The method 500 is done in block 599.

Figure 6:
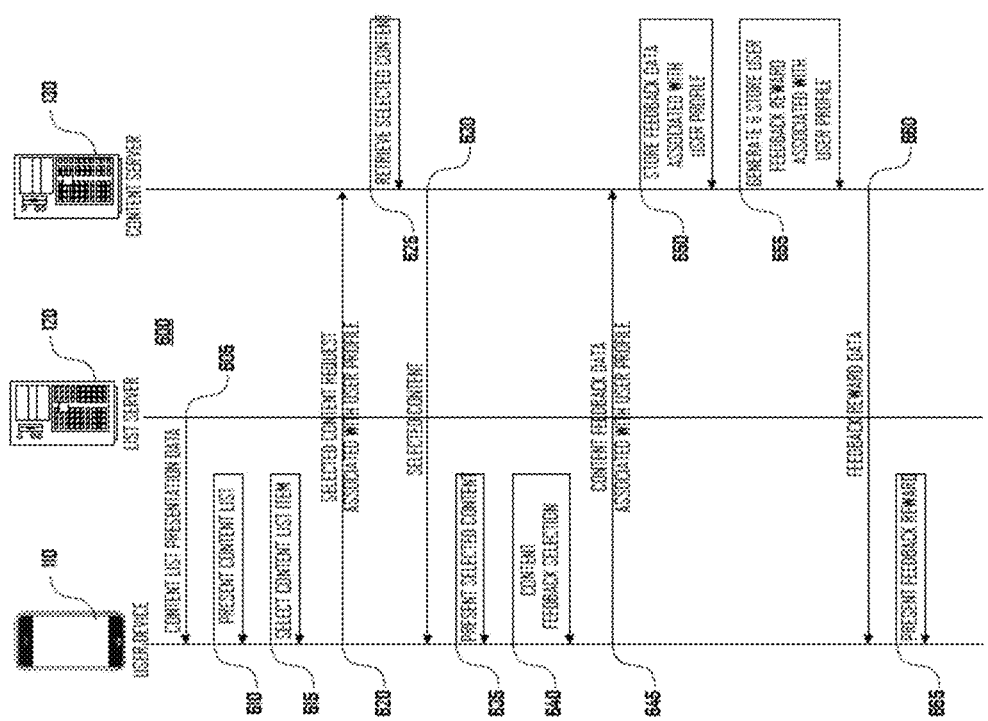
FIG. 6 is an exemplary data flow diagram illustrating an embodiment, in which content feedback is received and a feedback reward is generated.

FIG. 6 is an exemplary data flow diagram illustrating an embodiment of a data flow path 600 between a user device 110, the list server 120 and content server 130 of FIG. 1, in which content feedback is received and a feedback reward is generated.

Figure 7:
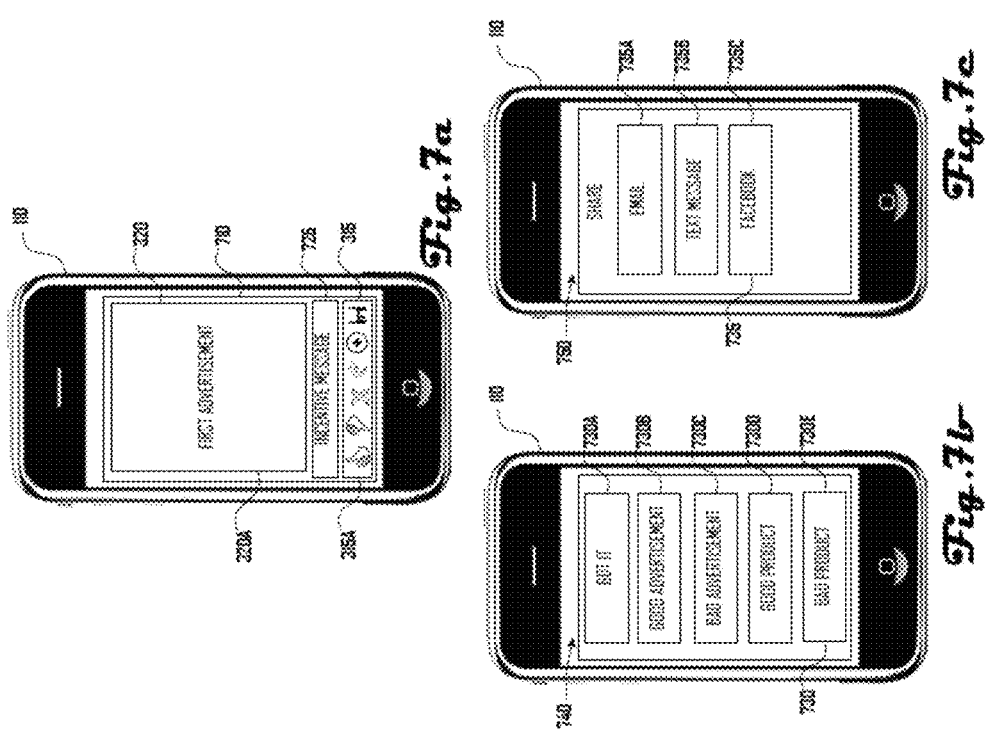
FIG. 7a depicts a user interface presenting content in accordance with an embodiment.
FIG. 7b depicts a user interface for content feedback in accordance with an embodiment.
FIG. 7c depicts a user interface for sharing content in accordance with an embodiment.

The data flow 600 begins at 605 where content list presentation data is sent to the user device 110, and at 610, the user device 110 presents the content list (e.g., as depicted in FIG. 3). At 615, a content list item 310 (FIG. 3) is selected, and at 620, a selected content request associated with a user profile is sent to the content server 130. At 625, the selected content is retrieved and sent to the user device 110, at 630, where the selected content is presented, at 635. For example, as depicted in FIG. 7*a*, selected content 710 may be presented, which includes an advertising portion 320, a content action portion 315, and an incentive action portion 725.

Returning to the data flow 600, a content feedback selection is made, and content feedback selection data associated with the user profile is sent to the content server 130, at 650. For example, referring to FIGS. 7*a* and 7*b*, a content feedback selection may include a feedback selection such as positive or negative feedback selected via the content action portion 315. In some embodiments, the incentive action portion 725 may display an incentive message such as "provide feedback to get a discount." The user may click the incentive action portion 725, which may present a feedback menu 740, which allows for selection of one or more feedback items 730 (e.g., feedback items 730A-E). One or more feedback items may be selected to indicate that the user has purchased or owns the advertised good, or has received the advertised services (e.g., "GOT IT" feedback item 730A); to indicate positive or negative feedback about advertising content 320 (e.g., 730B, 730C); or provide positive or negative feedback about an advertised product or service (e.g., 730D, 730E). In some embodiments, feedback may also include positive or negative feedback regarding a company associated with advertising content 320; feedback regarding likelihood of purchasing an advertised good or service; feedback regarding an advertised price; or the like. In some embodiments, feedback may include a sliding scale, text input, yes/no questions, positive feedback, neutral feedback; negative feedback, a star rating, or the like.

Returning to the data flow path 600, feedback data is stored associated with the user profile, at 650, and a user feedback reward associated with the user profile is generated and stored at 655. Feedback reward data is sent to the user device 110, at 660, where the feedback reward is presented, at 665. For example, a user may select a feedback item 730 as shown in FIG. 7*b*, and the interface may then return to the selected content 710, and the incentive action portion 725 may indicate or present a feedback award (e.g., "you have received 5% off this advertisement").

Figure 8:
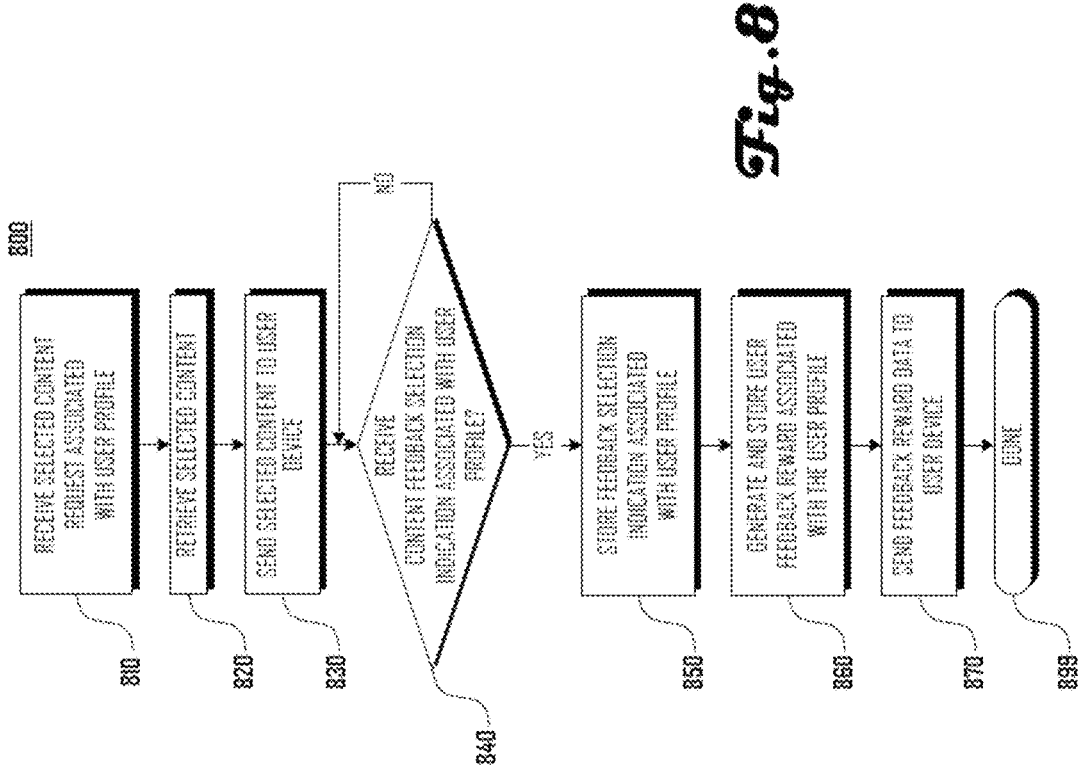
FIG. 8 is an exemplary flow chart illustrating an embodiment of a method executed by the content server of FIG. 1, for content feedback.

FIG. 8 is an exemplary flow chart illustrating an embodiment of a method 800 executed by the content server of FIG. 1, for content feedback. The method 800 begins in block 810, where a selected content request associated with a user profile is received, and at 820, selected content is retrieved. At 830, selected content is sent to a user device 110, and in decision block 840 a determination is made whether a content feedback selection indication associated with a user profile is received.

If a content feedback selection indication associated with a user profile is not received, the method 800 waits until a content feedback selection indication associated with a user profile is received. If a content feedback selection indication associated with a user profile is received, then in block 850, the received feedback selection indication is stored. At 860, a user feedback reward associated with the user profile is generated and stored, and at 870, user feedback reward data is sent to the user device 110.

Figure 9:
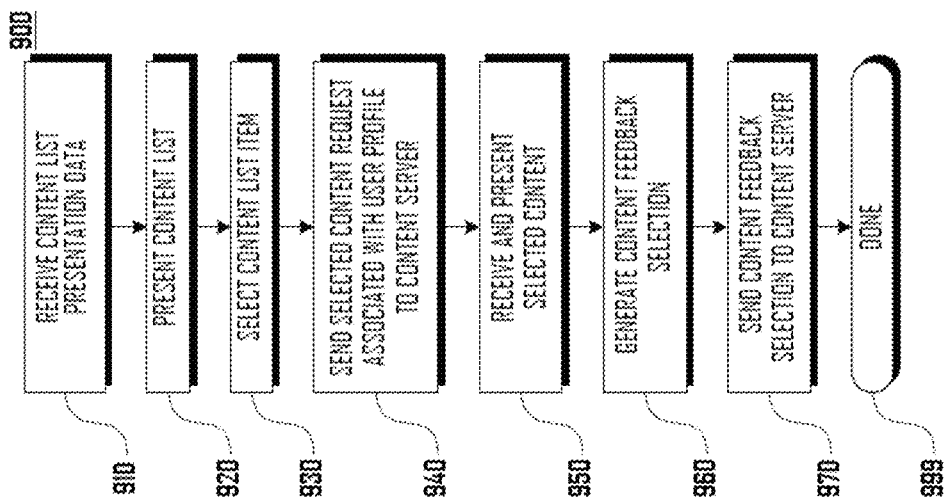
FIG. 9 is an exemplary flow chart illustrating an embodiment of a method executed by a user device of FIG. 1, for content feedback.

FIG. 9 is an exemplary flow chart illustrating an embodiment of a method 900 executed by a user device of FIG. 1, for content feedback. The method 900 begins in block 910, where content list presentation data is received, and in block 920, the content list is presented. In block 930, a content list item selection is made, and in block 940, a selected content request associated with the user profile is sent to the content server 130. In block 950, selected content is received and presented, and in block 960, a content feedback selection is generated. In block 970, a content feedback selection is sent to the content server 130, and the method 900 is done in block 999.

Figure 10:
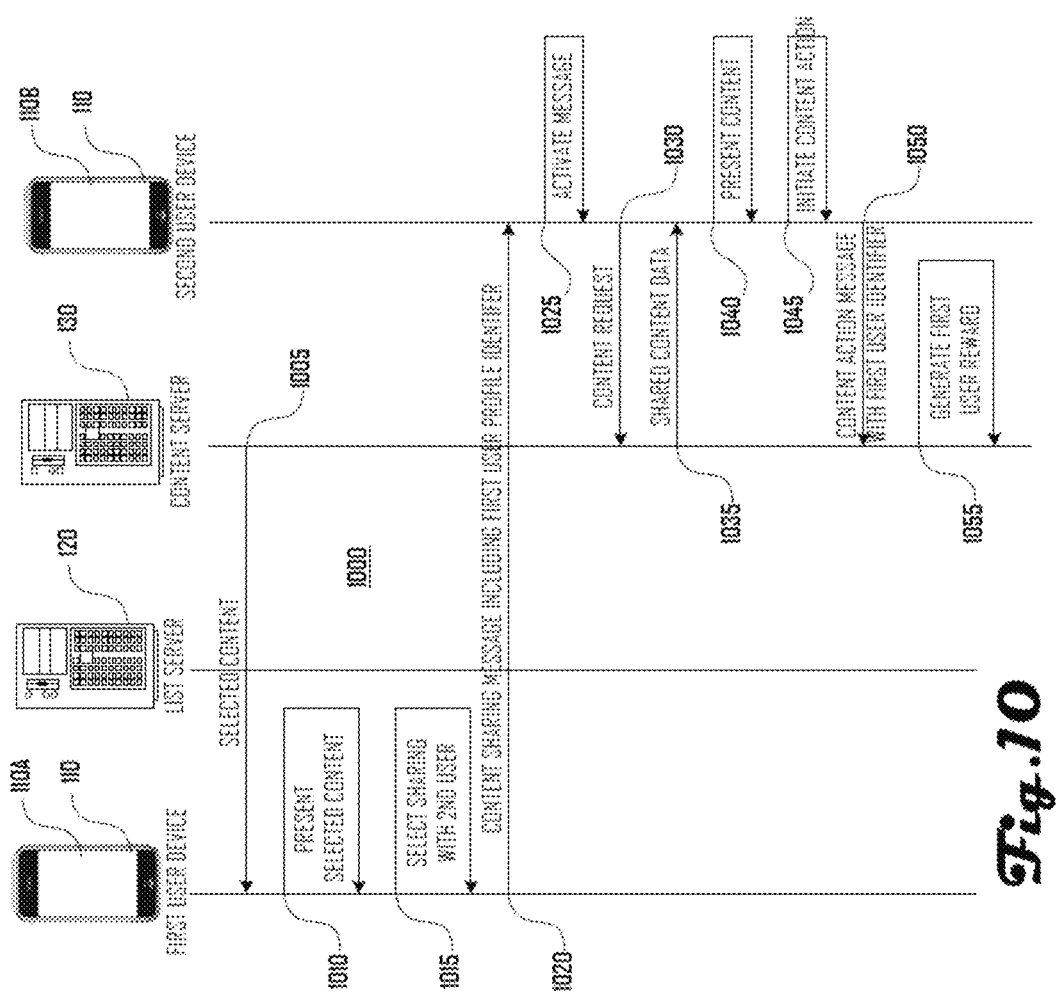
FIG. 10 is an exemplary data flow diagram illustrating an embodiment of a data flow path between the first and second user device and the list server and content server of FIG. 1, in which a user reward is provided.

FIG. 10 is an exemplary data flow diagram illustrating an embodiment of a data flow path 1000 between the first and second user device 110A, 110B and the list server 120 and content server 130 of FIG. 1, in which a user reward is provided. The data flow path 1000 begins where selected content is sent to the first user device 110A, at 1005, and the selected content is presented, at 1010. For example, presentation of selected content may be as depicted in FIG. 7*a*.

At 1015, sharing with a second user is selected and a content sharing message is sent to the second user device 110B, at 1020. For example, a user may select sharing with a second user via the incentive action portion 725 or via the content action portion 315 as shown in FIG. 7*a*. In some embodiments, the incentive action portion 725 may provide a message indicating a sharing incentive, which may include a message such as "share this advertisement with a friend to receive a discount." The user may click the incentive action portion 725 and be presented with a sharing menu 750 as depicted in FIG. 7*c*, which includes a plurality of sharing buttons 735, which may provide an option to share via email 735A, a text message 735B, a social network such as Facebook 735C, or the like.

Clicking a sharing button 735 may initiate communicating a sharing message. A sharing message may include a link to content, and may also include or be associated with a user profile or user profile identifier associated with the sending user. Although FIG. 10 depicts a content sharing message being provided directly to a second user device 110B, in various embodiments, one or more devices, servers, networks or the like may be used to send a sharing message to a second user device 110B. For example, sending an e-mail sharing message may include one or more e-mail server; sending a sharing message via a social network may include a social network server; sending a sharing message may involve the list server 120 or content server 130 in some embodiments; or the like. Accordingly, sending messages via conventional means is contemplated as part of the present disclosure.

Returning to the data flow path 1000 of FIG. 10, at 1025, the content sharing message is activated at the second user device 110B, and a content request is sent to the content server 130, at 1030. Shared content data is provided to the second user device 110B, at 1035 and at 1040, the shared content is presented at the second user device 110B.

In some embodiments, presenting the shared content may be via a user interface as depicted in FIG. 7*a*, and the second user device 110B may have a copy of a device application on the first user device 110A that facilitated sending the content sharing message. However, in some embodiments, content may be presented on the second user device 110B in any suitable way, including by clicking a link and presenting content in a web browser or the like.

Activation of the content sharing message, at 1025, may or may not include user interaction. For example the content sharing message may self activate and present content without user interaction. In other embodiments, a hyperlink, file, or the like may be received, which may be executed or clicked by a user to present or initiate presentation of the shared content.

Returning to the data flow path 1000, a content action is initiated, at 1045, and a content action message with a first user profile identifier is sent to the content server 130, at 1050. A first user reward is generated, at 1055, which is associated with the first user profile.

For example, in addition to possibly receiving a reward for sharing content or an advertisement with a friend, a sharing user may also receive a reward when the friend performs an action with the shared content. A content action may include buying a product or service, viewing media, visiting a website, viewing shared content, a social network action, or the like.

For purposes of tracking and ensuring that the appropriate user is provided with a reward, a user profile indicator may be included in content sharing messages and in features of shared content so that actions by the second user may be tracked in relation to the first sharing user. The first user may then be rewarded based on various behaviors of the second user, and may receive a greater reward for greater interaction or additional sharing of the content by the second user. For example, if the second user simply views the shared content, there may be less of a reward than if the second user purchases a good or service associated with an advertisement or if the second user shares the content with other users.

As discussed herein, rewards and incentives may include any suitable reward or incentive, and may include a monetary reward, free goods or services, discounted goods and services, a coupon, entry into a raffle, free or discounted tickets or admittance to a venue, virtual currency, points, an award, publicity, or the like.

Figure 11:
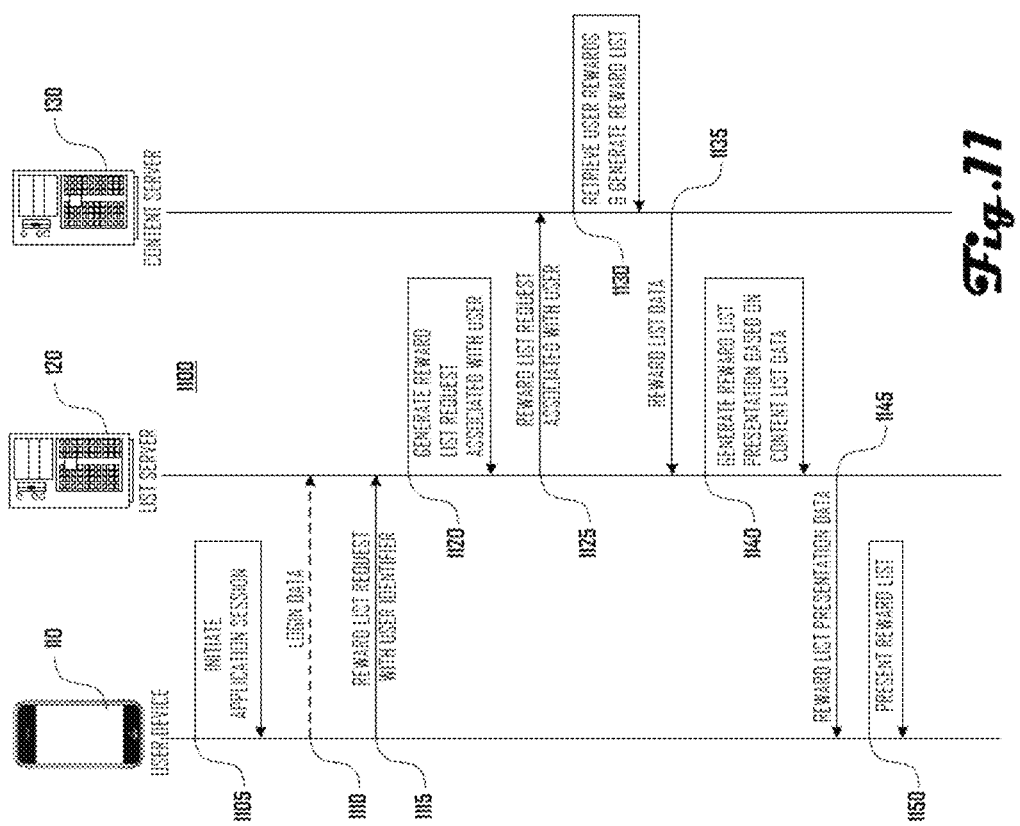
FIG. 11 is an exemplary data flow diagram illustrating an embodiment of a data flow path between a user device, the list server and content server of FIG. 1, in which a user reward is presented on the user device.

FIG. 11 is an exemplary data flow diagram illustrating an embodiment of a data flow path 1100 between a user device 110, the list server 120 and content server 130 of FIG. 1, in which a reward list is generated and presented. The data flow path 1100 begins where the user device 110 initiates an application session at 1105, and at 1110, in an optional step, login data is sent to the list server 120.

At 1115, a reward list request associated with a user profile is sent to the list server 120, where a reward list request is generated at 1120, which is associated with the user profile. The reward list request associated with the user profile is sent to the content server 130, at 1125, where a reward list is generated based on the user profile.

For example, in an embodiment, a user may want to receive an updated list of rewards received by the user, and the application running on the user device 110 may request an updated reward list from the list server 120. The list server 120 may then communicate with one or more content servers 130 to obtain a portion of the reward list. User reward data may also be stored on the list server 120 in some embodiments.

Reward list data is sent to the list server 120, at 1135, and a reward list presentation is generated based on the reward list data, at 1140. Reward list presentation data is sent to the user device 110, at 1145, and the user device 110 presents the reward list, at 1150.

Users may be informed of rewards that they have earned in other ways. For example, users may also receive an e-mail, text message, or the like, which informs the user of earned user rewards. Additionally, reward data may be presented via a content presentation (e.g., FIG. 7a-c). For example, an earned reward may be displayed in an incentive action portion 725, or other portion of a content presentation.

Figure 12:
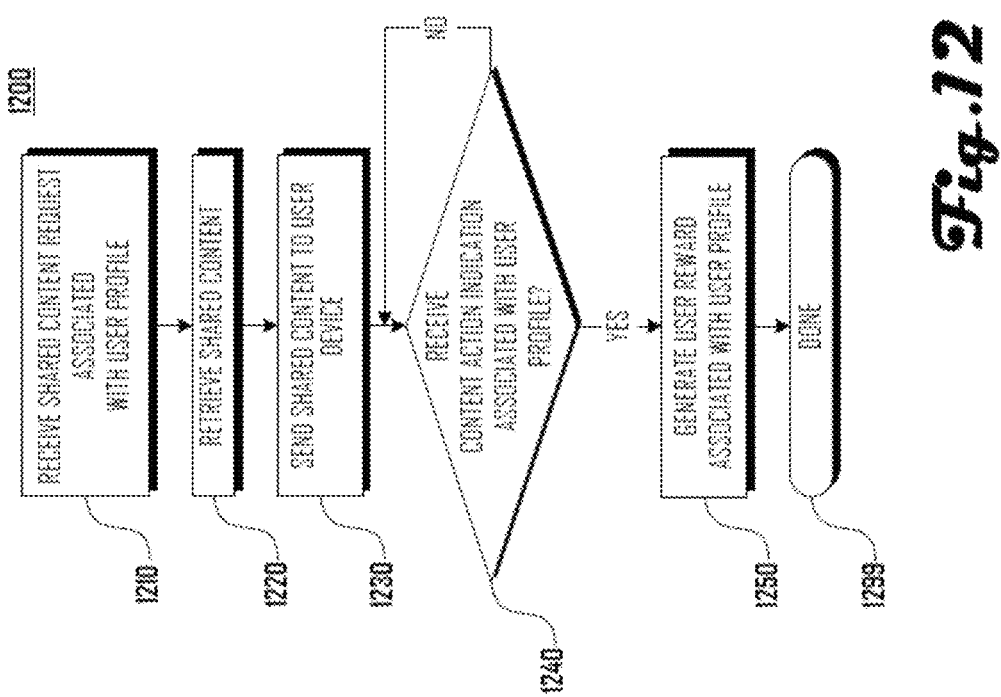
FIG. 12 is an exemplary flow chart illustrating an embodiment of a method executed by the content server of FIG. 1, for generating a user reward associated with a user profile.

FIG. 12 is an exemplary flow chart illustrating an embodiment of a method 1200 executed by the content server of FIG. 1, for generating a user reward associated with a user profile. The method 1200 begins in block 1210 where a shared content request associated with a user profile is received, and in block 1220, the shared content is retrieved. In block 1230, the shared content is sent to a user device 110, and in decision block 1240, a determination is made whether a content action indication associated with the user profile is received, and if not, the method 1200 waits until a content action indication associated with the user profile is received.

However, if a content action indication associated with the user profile is received, then in block 1250, a user reward associated with the user profile is generated, and the method 1200 is done in block 1299.

Figure 13:
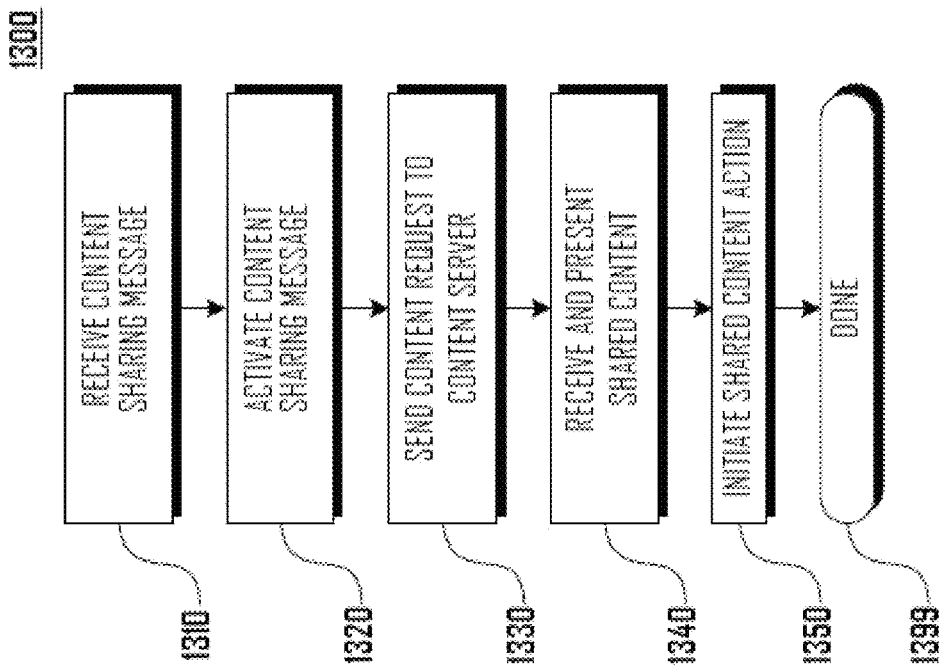
FIG. 13 is an exemplary flow chart illustrating an embodiment of a method, executed by a user device of FIG. 1, for initiating a content action related to received shared content.

FIG. 13 is an exemplary flow chart illustrating an embodiment of a method 1300, executed by a user device of FIG. 1, for initiating a content action related to received shared content. The method 1300 begins in block 1310, where a content sharing message is received, and in block 1320, the content sharing message is activated. In block 1330, a content request is sent to the content server 130, and in block 1340, shared content is received and presented. In block 1350, a shared content action is initiated, and the method 1300 is done in block 1399.

Figure 14:
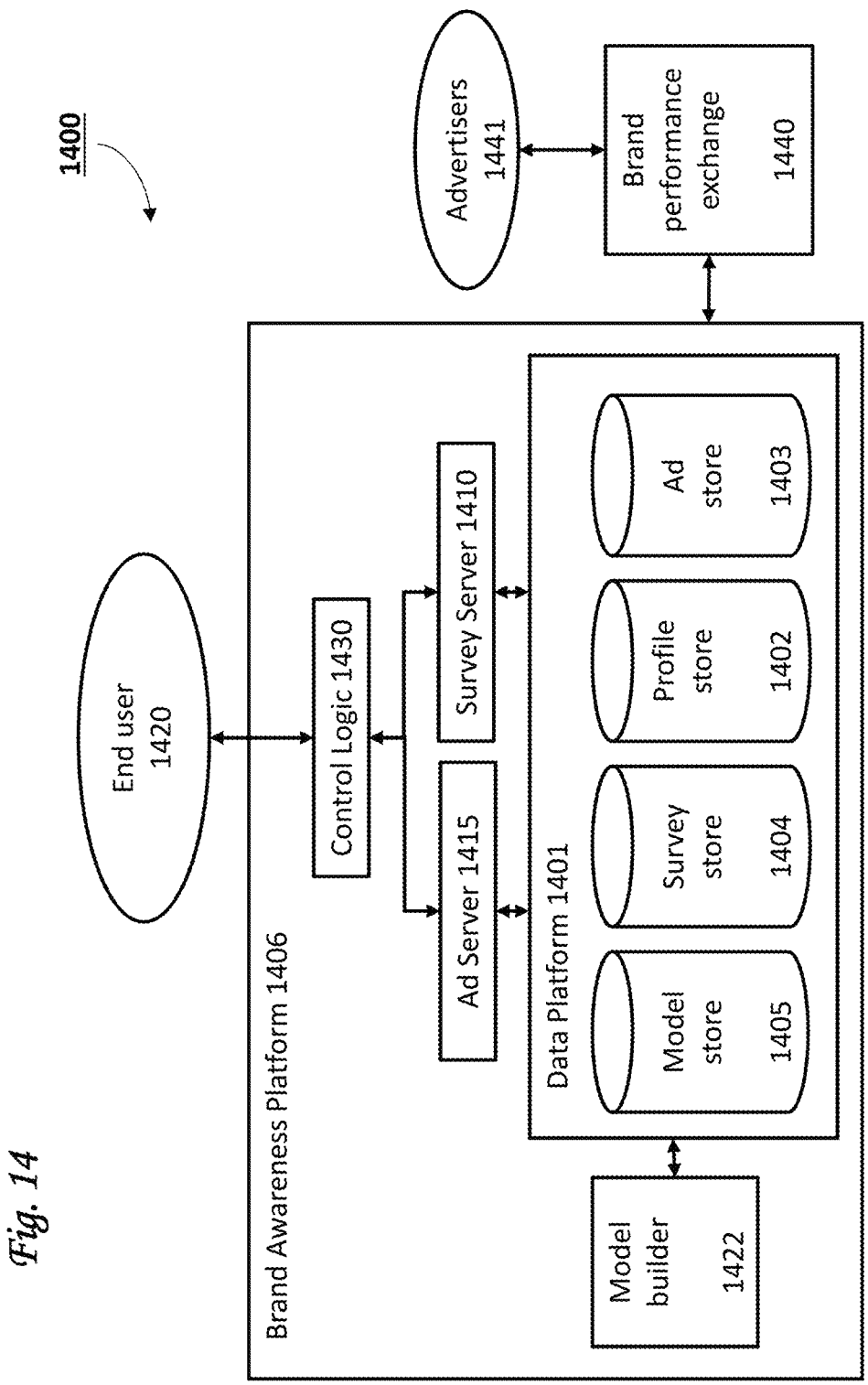
FIG. 14 is an exemplary top-level diagram illustrating one embodiment of a data optimization system.

Turning to FIG. 14, an alternative embodiment of the system 100 is shown. As shown, a data optimization system 1400 for collecting brand awareness and advertising campaign performance results in real-time is shown. The data optimization system 1400 can accurately assess an advertising campaign's effectiveness, in real-time, by use of concurrent surveys while the campaign is running. Although not limited to advertising, the data optimization system 1400 is preferably applied in any field where survey results are used for assessing effectiveness of an action taken by a company or institution intended to inform or alter behavior. For example, the data optimization system 1400 is particularly well suited to determine the effectiveness of public information campaigns by a government, new product or functionality notifications by companies for current subscribers or product owners, security advisory messages from banks to their existing customers, and so on. In the following description, brand advertising is used as a specific example for illustrative purposes only.

As shown, the data optimization system 1400 includes a brand awareness platform 1406 that comprises a data platform 1401. The data platform 1401 includes a profile store 1402, a model store 1405, a survey store 1404, and an ad store 1403. The profile store 1402 can be the source of behavioral user data that the data optimization system 1400 uses to build predictive models. The profile store 1402 can also manage other objective user data such as age, income, place of residence, etc. The model store 1405 maintains predictive models that the model builder 1422 builds for targeting content to individuals. An advertising campaign comprises a set of brand awareness ads and/or other content, provided by the advertisers 1441 that the system serves to the users. The ad store 1403 includes the brand awareness ads and/or other content. The data optimization system 1400 serves the brand awareness ads and/or other content to the end users 1420. With each advertising campaign, a set of survey questions can be used to measure the effectiveness of that advertising campaign. The survey store 1404 includes all the surveys defined for individual campaigns from the advertisers 1441.

The data optimization system 1400 also includes a control logic unit 1430. A selected end user 1420 can send a content request, such as an ad request, via a user device (not shown) to the control logic unit 1430. The control logic unit 1430 determines whether the selected end user 1420 receives an ad or a survey, as described with reference to FIG. 20. Additionally, the data optimization system 1400 includes a survey server 1410 in communication with the data platform 1401 and the control logic unit 1430 to handle the transmission of surveys and storage of the responses. Although shown as a separate schematic block in FIG. 14, the survey server 1410 can reside on and/or share resources of the data platform 1401. The data optimization system 1400 further comprises an ad server 1415 in communication with the data platform 1401 and the control logic unit 1430. When the control logic unit 1430 determines that an ad should be served to a user (rather than a survey), the ad server 1415 determines which ad to serve using the predictive models stored in the model store 1405. End users 1420 can interact with the data platform 1401 via the ad server 1415 or the survey server 1410. The data optimization system 1400 shown in FIG. 14 also includes a model builder 1422 in communication with the data platform 1401.

The model builder 1422 creates and/or updates a predictive model representing users that are most likely to be influenced by exposure to one of the available ads. This can occur either as an online or offline process. The function of the model is to maximize any brand awareness metric that a system operator wishes to increase. For example, a brand awareness metric can include an intent to purchase or the likelihood of visiting a retail store.

The data optimization system 1400 can provide benchmarking information on the performance of various brand advertisements in a brand performance exchange 1440.

Advertisers 1441 can monitor the performance of their own campaigns during the campaign, compare performance with that of participating competitors, both at the general market average level (and the individual campaign level), view the characteristics of individuals that are influenced by brand advertising, and understand the messages that drive brand awareness. Stated in another way, the brand performance exchange 1440 allows companies to exchange benchmark performance data with other similar registered companies.

A process for survey optimization can be triggered by receipt of a content request, such as an ad request, associated with a user identification (user ID). The content request can include a request to display an advertisement in real-time on a user's device, where the data optimization system 1400 decides whether to fill this advertisement request or whether to ignore it.

Figure 19B:
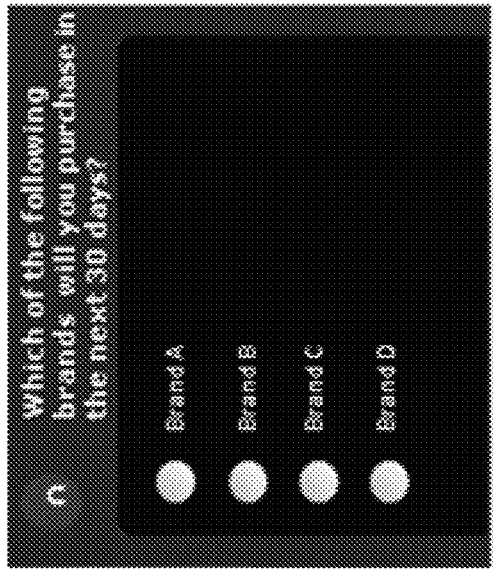
FIG. 19B depicts a user interface presenting survey in accordance with an embodiment that can be used with the data optimization system of FIG. 14.
Figure 19A:
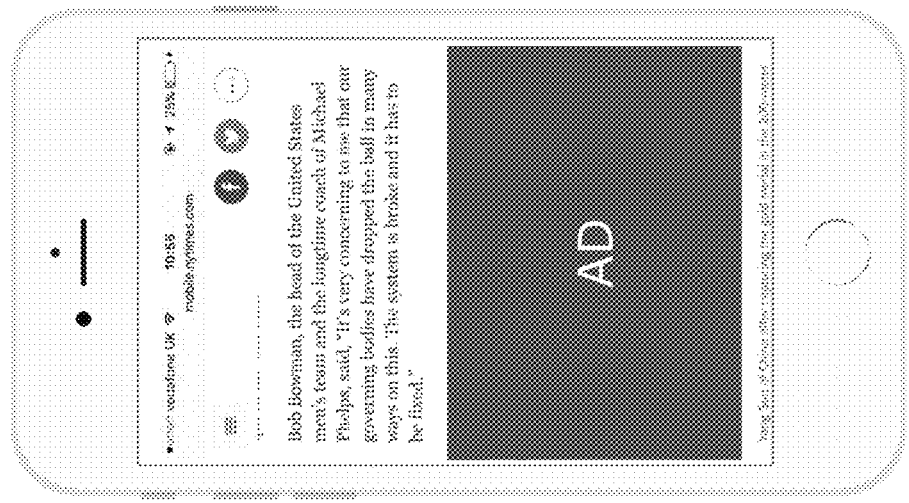
FIG. 19A depicts a user interface presenting content in accordance with an embodiment that can be used with the data optimization system of FIG. 14.

The brand awareness platform 1406 listens for content requests. On receipt of a content request, the brand awareness platform 1406 retrieves any user data from the profile store 1402 for the selected user identifier associated with the request. Any user identifier can be used to identify the selected end user 1420 that made the content request; however, exemplary user identifiers include a deviceID associated with a mobile device when communicating with advertising platforms. Additionally and/or alternatively, the user identifier includes a cookie from a desktop computer or any other unique string that identifies the sending device. The brand awareness platform 1406 passes the content request with the corresponding profile data to the control logic unit 1430, waits for a response, returns this response, if there is one, to the selected end user 1420. The brand awareness platform 1406 also updates the brand performance exchange 1440 with real-time performance results. An exemplary advertisement campaign is shown in FIG. 19A.

In operation, the brand awareness platform 1406 can listen for content requests from the user device of a selected end user 1420. These content requests can be received through a well specified application programming interface ("API") or any other digital communication channel, such as communication ports (COM), Common Object Request Broker Architecture (CORBA), Enterprise JavaBeans (EJBs), and the like.

Figure 15:
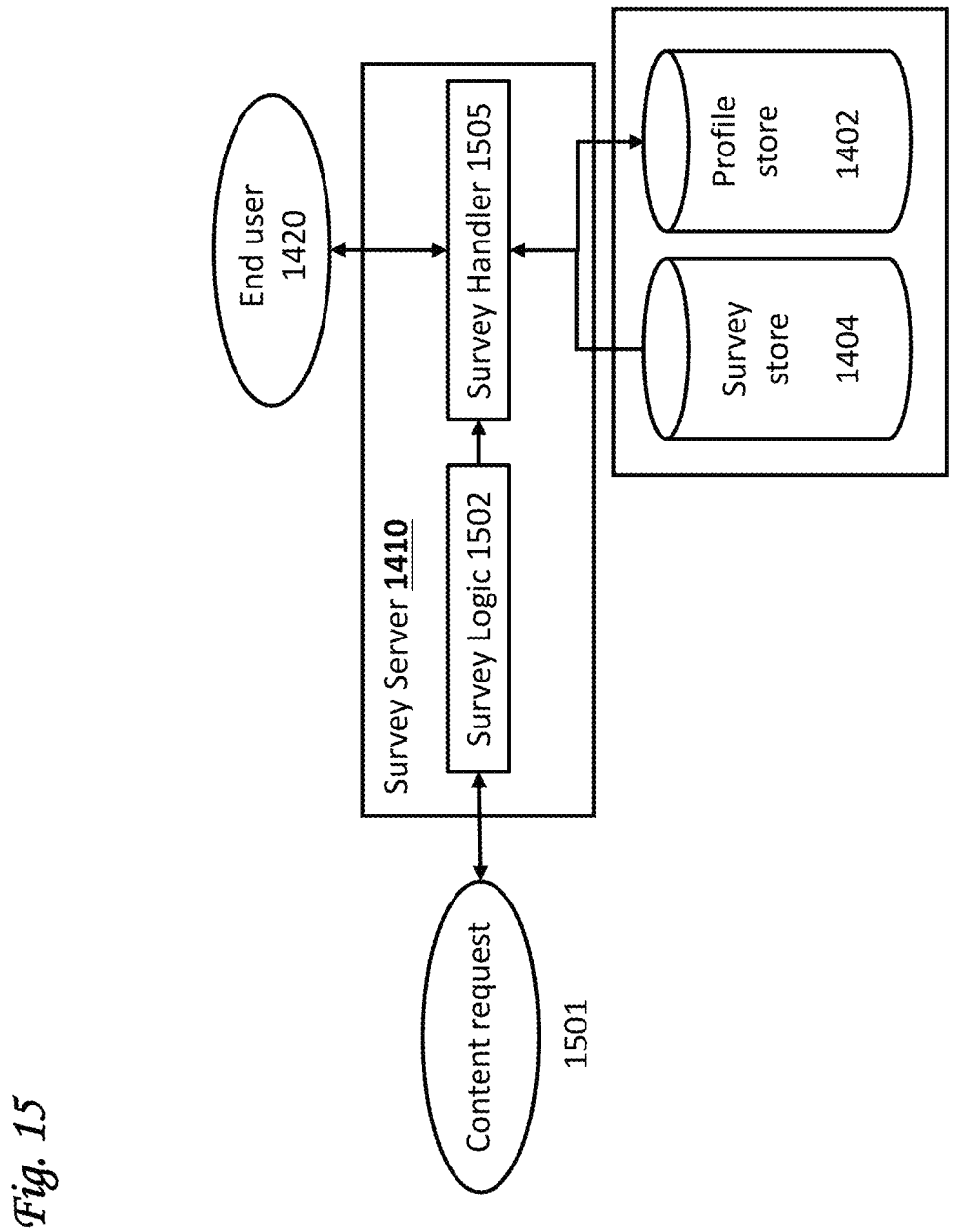
FIG. 15 is an exemplary top-level block diagram illustrating one embodiment of the survey server of the data optimization system of FIG. 14.

For handling a survey request, an exemplary block diagram illustrating the survey server 1410 in further detail is shown in FIG. 15. Turning to FIG. 15, the survey server 1410 includes a survey logic module 1502 that receives one or more content requests 1501. The survey logic module 1502 determines whether a survey will be sent and, if so, which particular survey. According to one embodiment, the survey logic module 1502 can select a small random sample of end users 1420 to be surveyed from those for which a content request is received. According to other embodiments, this sampling can occur before the survey request is received by the survey server 1410.

If the survey server 1410 determines that the identified user should be surveyed, a survey instruction is communicated to a survey handler 1505. The survey handler 1505 retrieves the appropriate survey from the survey store 1404 and transmits it to the identified user. A selected survey can be sent directly to a user's device, in place of an ad, and/or by text message (or a succession of messages), an email, a pop-up on a web browser, or via any other channel. Once the survey is received, the identified user can respond and the survey handler 1505 can receive and forward the response to be maintained in the profile store 1402.

The profile store 1402 maintains all profile information that the brand awareness platform 1406 has on each user having a user identifier. The profiles stored in the profile store 1402 include any population group a user is assigned to and what/when content or ads were shown to each user.

Returning to FIG. 14, the ad server 1415 can score each content request to determine whether they are likely to be influenced by exposure to a brand advertisement. For example, if a campaign has a requirement to achieve a specified number of ad views over a specific time, the ad server 1415 will make sure this number of ad views are served to the best prospects (e.g., the users most likely to increase the brand awareness metric).

Figure 16:
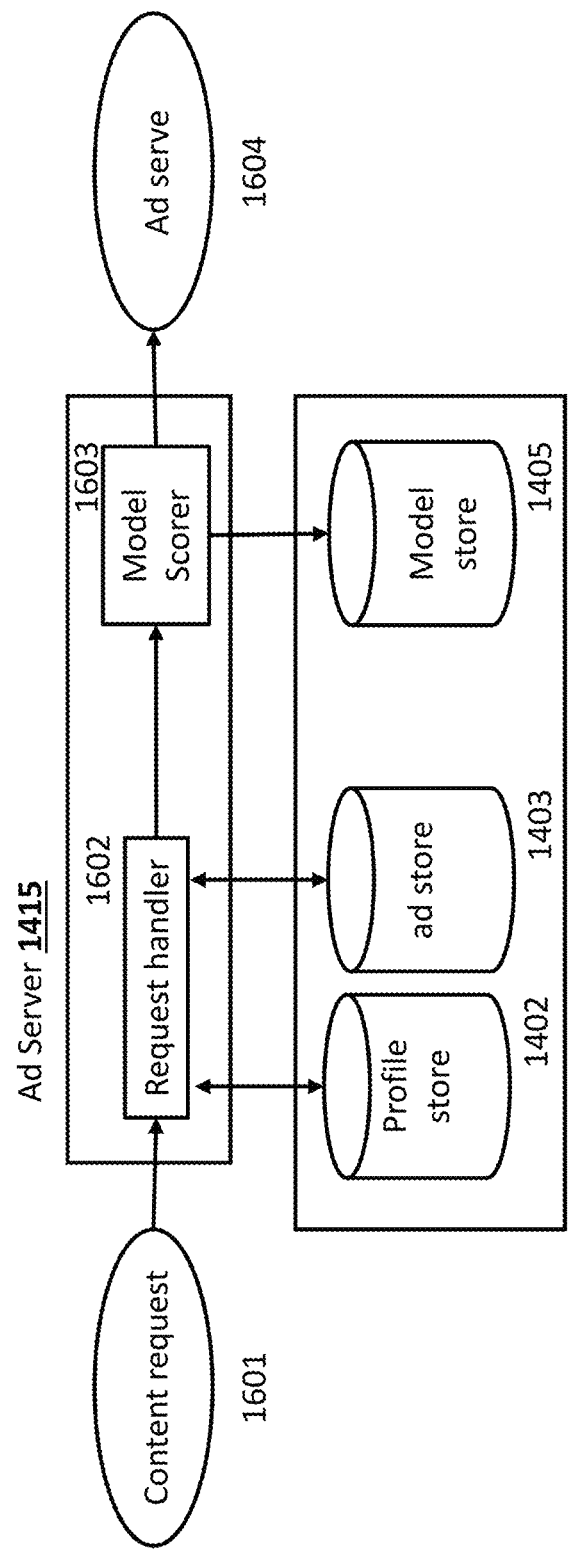
FIG. 16 is an exemplary top-level block diagram illustrating one embodiment of the ad server of FIG. 14.

For handling content requests, an exemplary top-level diagram illustrating the ad server 1415 in further detail is shown in FIG. 16. Turning to FIG. 16, the ad server 1415 includes a request handler 1602 in communication with a model scorer 1603. Although not shown, the content request includes a user identifier and a location. A location can identify where the ad is going to be displayed. The content request can also include details of the application or web page where the request originated, the format of the ad (e.g., html, jpg, etc.), the size of the display spot, and any other information available in the request. The model builder 1422 and model scorer 1603 can use this information, along with the profile data, to decide which ads are suitable and which ads are not suitable to display to maximize the brand awareness metric. The request handler 1602 receives the content request 1601 via the control logic 1430 from the user device. The request handler 1602 first retrieves profile information, if present, from the profile store 1402 for the selected user. The profile is retrieved using the user ID sent with the request. The request handler 1602 retrieves the set of available ads that can be served for the particular location, from the ad store 1403.

Once the request handler 1602 has determined the available set of ads that can be served at this location, this set of available ads is passed to the model scorer 1603. The model scorer 1603 determines which of these advertisements, if any, to return to the user. The model scorer 1603 evaluates the predictive model learned by the model builder 1422 and thus can preferentially serve ads to those users more likely to increase the brand awareness metric associated with that particular campaign.

In some embodiments, the data optimization system 1400 collects survey data from a sample of users and uses machine learning to build predictive models to infer brand awareness level or other metrics (e.g., intent to purchase, intent to visit retail store, etc.) of any user, not only those in the surveyed sample, and determine a score for the metric. An appropriate score can be determined in real-time, whenever a user is seen. This real-time prediction is then used to automatically determine which advertisement, if any, to show to a particular user.

The data optimization system 1400 can collect brand awareness and advertising scores in any suitable manner discussed above, including the processes shown below with reference to FIGS. 17-18 and 20-21C. Although each of the methods below illustrates a plurality of processes, each process need not be performed in the order depicted. For example, each process can be distributed across multiple processors in a variety of ways and not necessarily separated into the operations illustrated for exemplary purposes only.

Figure 17:
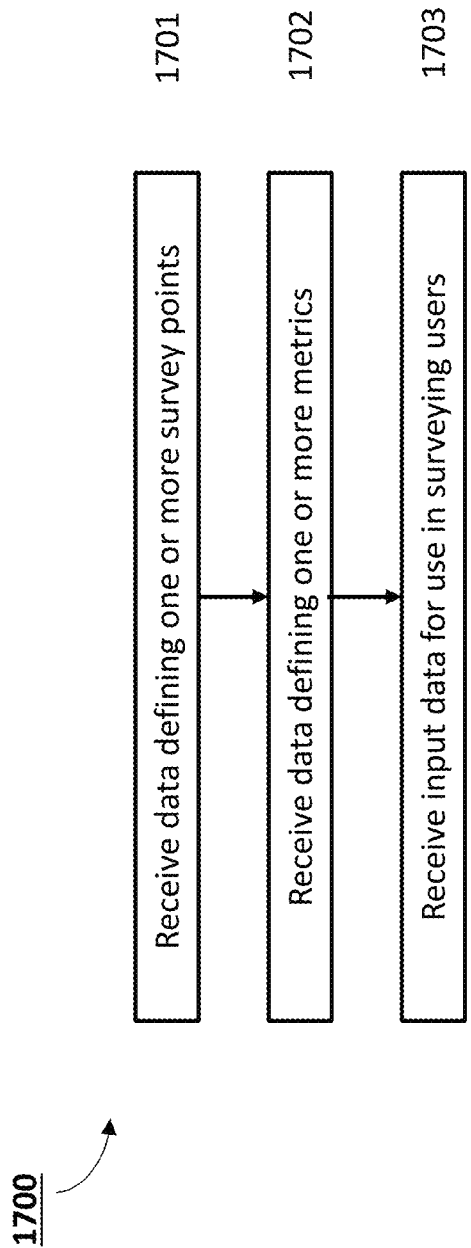
FIG. 17 is an exemplary data flow diagram illustrating one embodiment of a configuration of the data optimization system of FIG. 14.

FIG. 17, an exemplary process 1700 for configuring the data optimization system 1400.

For a new campaign, one or more survey points are received at the survey store 1404, for example, from a system operator (not shown) (at step 1701) as configuration for the control logic 1430. For a particular campaign, a user may see a series of brand awareness ads and one or more surveys. Each view of an ad or survey is hereafter referred to as an interaction. Survey points are the subset of interactions, within a series of interactions where the user could be sent a survey. For example, a survey point can be defined as occurring a certain number of exposures or a certain length of time after the last exposure of the ad.

The survey store 1404 can also receive one or more brand awareness metrics (at step 1702) that are stored in the model builder 1422 and used to build the predictive models for targeting. Brand awareness metrics can include metrics that can be determined using survey data, for example brand awareness level, intent to purchase or intention to visit retail store. The configuration operation may also include the determination of a threshold for each metric, which can be used in conjunction with the model score to determine which content requests to serve an ad to and which to ignore. More than one threshold may be determined for a metric. For example, different thresholds may be used for different groups of users.

The survey store 1404 then receives one or more surveys (at step 1703) to test one or more of the metrics defined at step 1702. These surveys might include the text for questions to be put to users, ranges of possible responses, and other presentation data.

Figure 18:
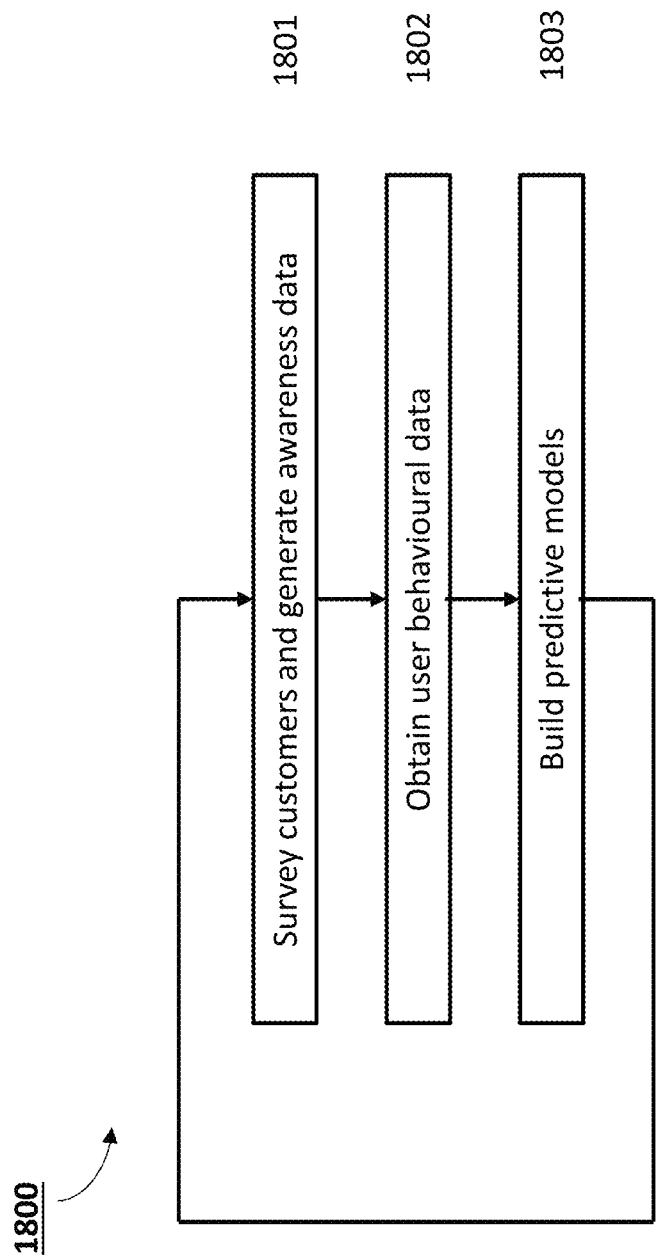
FIG. 18 is an exemplary data flow diagram illustrating one embodiment for building and providing feedback for predictive models that can be used with the data optimization system of FIG. 14.

FIG. 18 shows an exemplary embodiment of a process for the data optimization system 1400 to survey a selection of users and present relevant advertisements.

Referring to FIG. 18, a sample of users is surveyed (at step 1801) at one or more points in their series of interactions. Surveys can be sent in various ways using one or more channels including, but not limited to, presentation of a survey in place of an advertisement to a mobile or other device, email, text and telephone call. Surveying can include one or more questions and can be sent automatically, as discussed in FIGS. 20-21C. An example of surveying direct to a mobile device in place of an advertisement is illustrated in FIG. 19B which shows a question with answers presented on the screen of a smart phone.

The question or questions asked in a survey can relate to the brand awareness metric. The question or questions can require a textual or numerical value in response or a response that can be represented as a numerical value. For example, "yes" and "no" can be represented in binary form and a range of descriptors from "excellent" to "very poor" can be represented on a scale of 1 to 10.

A predetermined percentage of users (e.g., between 1% and 10%) can be surveyed once they have been exposed to the advertisement a certain number of times or at a chosen time of surveying. According to some embodiments, the control logic 1502 ensures that the surveying is random, for example, to ensure a representative sample and/or to avoid over-surveying users. For example, a die can be thrown in any manner (e.g., weighted or unweighted) each time a user arrives at a survey point to determine whether the user should be surveyed. The fall of the die indicates whether the user can receive a survey question or questionnaire. To avoid over-surveying, rules can be applied for example to avoid surveying users who have recently received another feedback request, or have been served several brand awareness advertisements within a short period of time, for example.

Each content request received by the brand awareness platform 1406 includes user behavioral data and other descriptive data. This data is recorded (at step 1802) in the profile store 1402 for use in the model builder 1422. For example, user behavioral and/or other descriptive data can include web pages viewed, mobile apps used, phone make and version, previously acquired data based on previous interactions with users. Additionally and/or alternatively, user behavioral and/or other descriptive data can be obtained in real time in operations running in parallel to the surveying of users or it can be inferred from advertisements shared by one user to another. Behavioral data can include mobile application usage or website page view data, location data, and a wide range of other recordable data relating to user behavior, such as previous clicks or other interactions with campaigns, direct feedback to ads (as in step 850 shown in FIG. 8) or the sharing of ads with other users (as shown in step 1050 of FIG. 10). Behavioral data can also be retrieved from a database, such as the profile store 1402. In some embodiments, the model builder 1422 obtains all, or a subset of, the data stored in the profile store 1402. For example, only the most recent data, defined by a predetermined time period (e.g., last 24 hours), can be retrieved.

The model builder 1422 builds a set of predictive models that can be used to estimate the brand awareness metric for all, including previously unseen, users (at step 1803).

For example, the model builder 1422 uses behavioral data from historical user interactions with relevant advertisements, together with the survey results, to build and/or update models that can predict a metric. According to embodiments, predictive models, such as shown in equation (1) below, can be used to determine a brand awareness metric for any user.

Advantageously, the model scorer 1603 can determine a brand awareness metric based on predictive models even for users having no survey data. That is, the predictive models can be used to extrapolate obtained survey results to the remainder of the population who were not surveyed. For example, the model builder 1422 can determine that the presence of certain features in the profile data is associated with an increased likelihood of responding positively to the survey question. The presence, or otherwise, of these features in the profile data of unsurveyed users enables the model scorer 1603 to estimate the likelihood of any individual user to respond positively to the survey question.

According to some embodiments, at each user interaction point, the predictive models are used to determine a brand awareness score in real-time. Each brand awareness score produces an estimate, or prediction, of a dependent variable, the metric, for an individual. For example, a linear regression model can be represented by equation (1):

$$\text{prediction} = c_1 x_1 + c_2 x_2 + \ldots + c_n x_n \tag{1}$$

where $c_1, c_2 \ldots c_n$ are coefficients and $x_1, x_2 \ldots x_n$ are independent variables including descriptive variables such as location, device type and behavioral variables built from previous interaction history. In some embodiments, the predictive model can include a weighted sum, such as shown in equation (1), but is not limited to such models.

In other embodiments, the predictive model can use any modeling technique, including but not limited to linear regression, logistic regression, decision tree, random forest, neural network, support vector machine, and Bayesian network. In some embodiments, the predictive model represents a combination of scores derived using different modeling techniques. For example a regression model (as shown in equation 1) may be combined with a neural network, or any other predictive model, to create a multi-stage model. In a preferred embodiment, the independent variables can characterize the user interaction history, or can be any other factors that can affect the user's brand awareness. Any number of variables can be taken into account in determining a brand awareness score. Examples of variables include, but are not limited to:

Location and location history
Previous mobile phone apps used
Device type, model, etc.
Biographical data such as age and gender
Number of previous brand ad views
Number of previous retail store visits
Previous relevant ad feedback events
Previous relevant ad sharing events with other users.
Etc.

Some models do not require any user-specific data, in which case, the building of the model or models can take place before the surveying of users and obtaining of user data at steps 1801 and 1802. Any subsequent user survey data, behavioral data, and/or descriptive data can then be used to update a previously created model. Accordingly, one or more models can be continually updated using any machine learning techniques in order to improve the accuracy of prediction as more data is gathered. This is shown in FIG. 18 (e.g., the returning loop from step 1803 to step 1801). The processes shown in FIG. 18 can be part of a continuous loop and can be performed in any order.

Sending surveys can be a synchronous process where the survey is sent in direct response to a content request. Alternatively, the process can be asynchronous where a survey is sent at some predetermined time after exposure to a brand ad exposure, possibly by a different channel (e.g., email or SMS).

Figure 20:
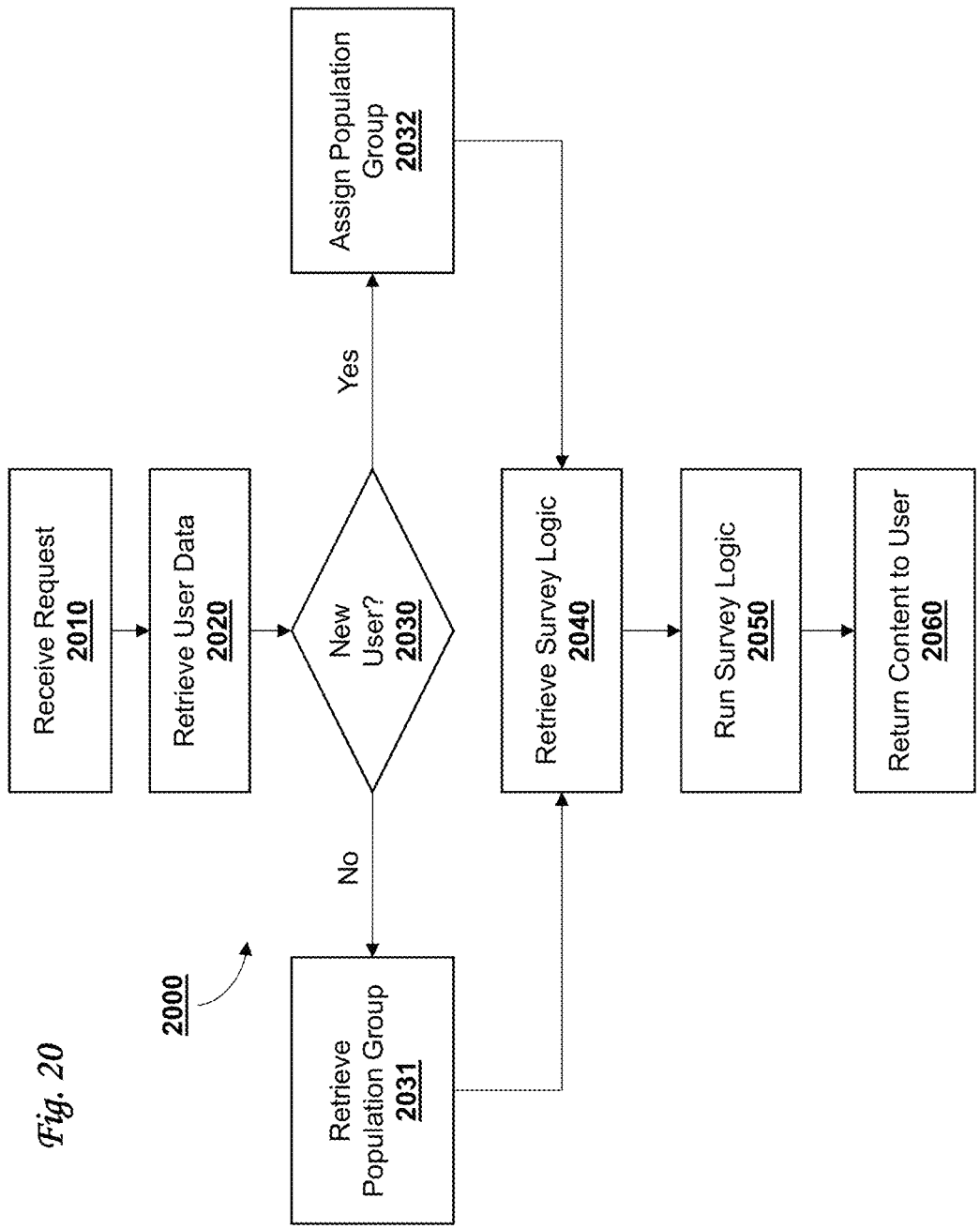
FIG. 20 is an exemplary data flow diagram illustrating an embodiment of a data flow path illustrating one embodiment of a process for survey logic shown in FIG. 18.

In some embodiments, the first time a user is seen, as identified by a user ID, or other identifier, the user is allocated to a selected group, called a population group. These groups are used primarily for measurement of the effect of the campaign, such as shown in FIG. 20. Turning to FIG. 20, an exemplary process 2000 for handling a content request is shown. When the control logic 1430 receives a content request (at step 2010), the survey handler 1505 queries the profile store 1402 to retrieve whatever data is known about this user ID 2020. If this is a previously unseen user, (at step 2030), a population group is assigned (step 2032). If the user is known, the user's existing population group is retrieved (at step 2031). The user can be assigned to the selected group permanently. The user can be randomly allocated to a selected group according to a predefined probability distribution, for example 40%, 40% and 10%. There can be any number of groups and for exemplary purposes only, the groups can include:

Group 1—Exposed users. These users always receive the brand advertisement.
Group 2—Exposed users using optimization. These users only receive the brand advertisement if the optimization system determines they are a good prospect.
Group 3—Control users. These users are not shown the brand advertisement. The system does not attempt to respond allowing the ad spot to be filled by some other provider showing some other content.

In some embodiments, the size of these groups will depend on the size of the campaign and the number of people it is desirable to survey. In a preferred embodiment, most users would be assigned to Group 2, using optimization to choose who receives the ad. However, the other groups can be large enough to ensure usable models are built during the campaign and statistically significant results seen at the end of the campaign.

The control logic unit 1430 determines which group the user is placed in. Once the group is chosen or retrieved, the survey from the survey store 1404 is retrieved 2040. The control logic unit 1430 then determines when and to whom a survey is sent, running the survey logic (at step 2050). The survey logic is described with reference to FIGS. 21A-21C. The content is delivered to the user (at step 2060).

Surveys can be sent during a subsequent visit by the same user, only to a consumer of panel participants or after a predetermined time. Respectively, survey logic for: "Next-Time-Same-User-Seen", "Consumer-Panel-Participant", or "After-Predetermined-Time" are shown below.

FIG. 21A illustrates an exemplary process 2040A providing an exemplary data flow of retrieving the survey logic 2040 for a "Next-Time-Same-User-Seen" survey. If the survey is only to be sent to a subset of the population, the survey logic 1502 randomly determines (e.g., dice throw) whether a survey is to be sent to this user (at step 2110). If the survey is to be sent continue, otherwise exit. If this is the second time the survey logic 1502 has received a content request from this user, then having been exposed to the ad, the user is eligible for a survey. The second visit condition is tested in step 2120. If the user is a first time visitor, an ad is served at step 2160. If the user is a second-time visitor, the survey is sent at step 2130. The survey handler 1505 waits for a response at step 2140. Finally, the response is recorded in the profile store 1402 at step

2150. For example, a multi-choice question (as shown in FIG. 19B) can be provided such that on selection of an answer, the answer is immediately sent back (at step 2040) to the brand awareness platform 1401. For third and subsequent requests, the ad is displayed at step 2160.

Figure 21B:
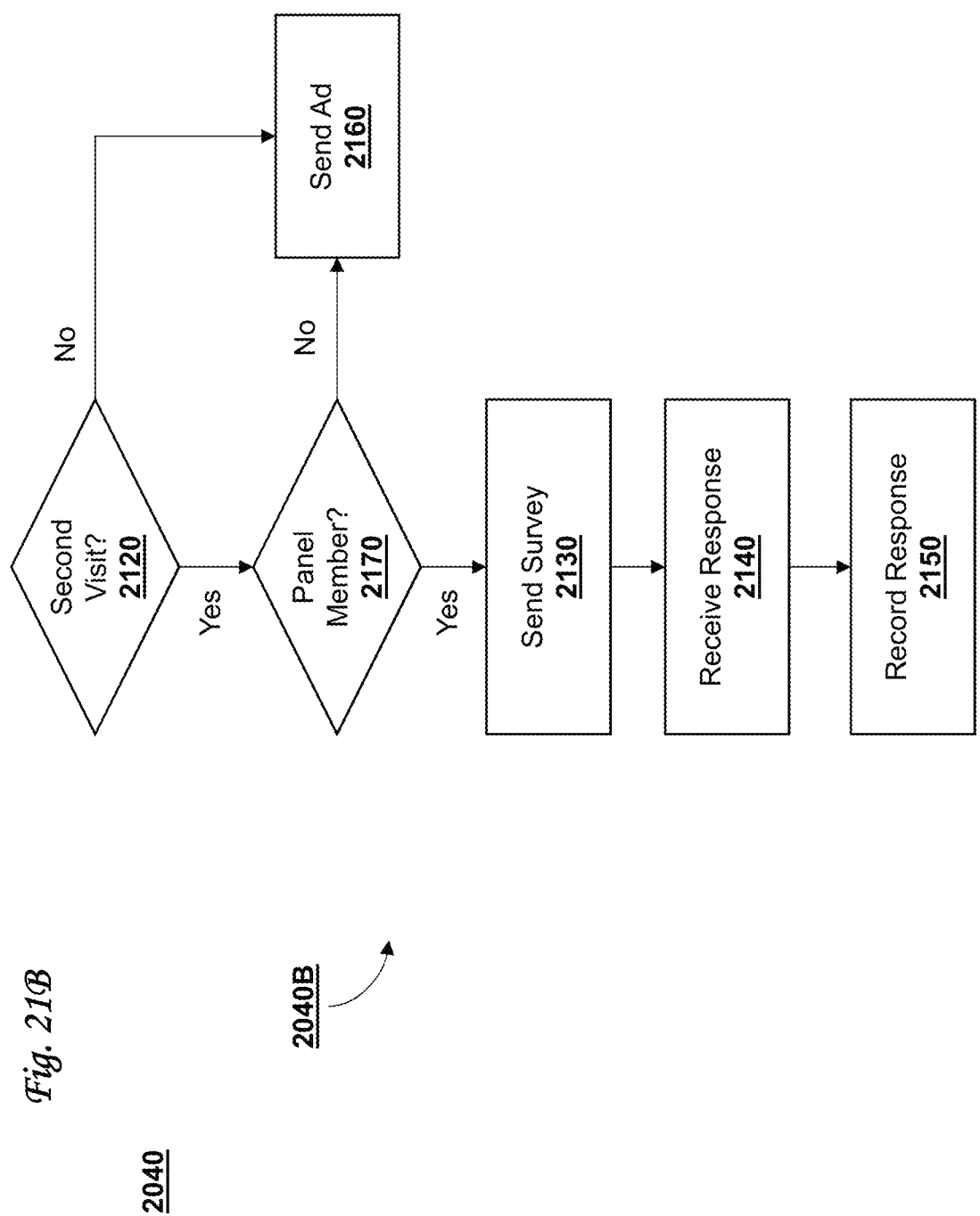
FIG. 21B is an exemplary data flow diagram illustrating an alternative embodiment of a data flow path for the survey logic of FIG. 20 where the survey logic is configured to "consumer panel".

FIG. 21B illustrates another exemplary process 2040B providing an exemplary data flow of the survey logic 2040 for a "Consumer-Panel-Participant" survey. If this is the second time the survey handler 1505 has seen this user and the user is a consumer panel member, then the survey handler 1505 schedules a survey to be sent after a predetermined delay time via a predetermined preferred channel. If the user is not a second time visitor (decision block 2120), an ad is served at step 2160. The survey is sent at 2130. The system waits for a response at 2140. Finally, the response recorded in the profile store 1402 at step 2150.

Figure 21C:
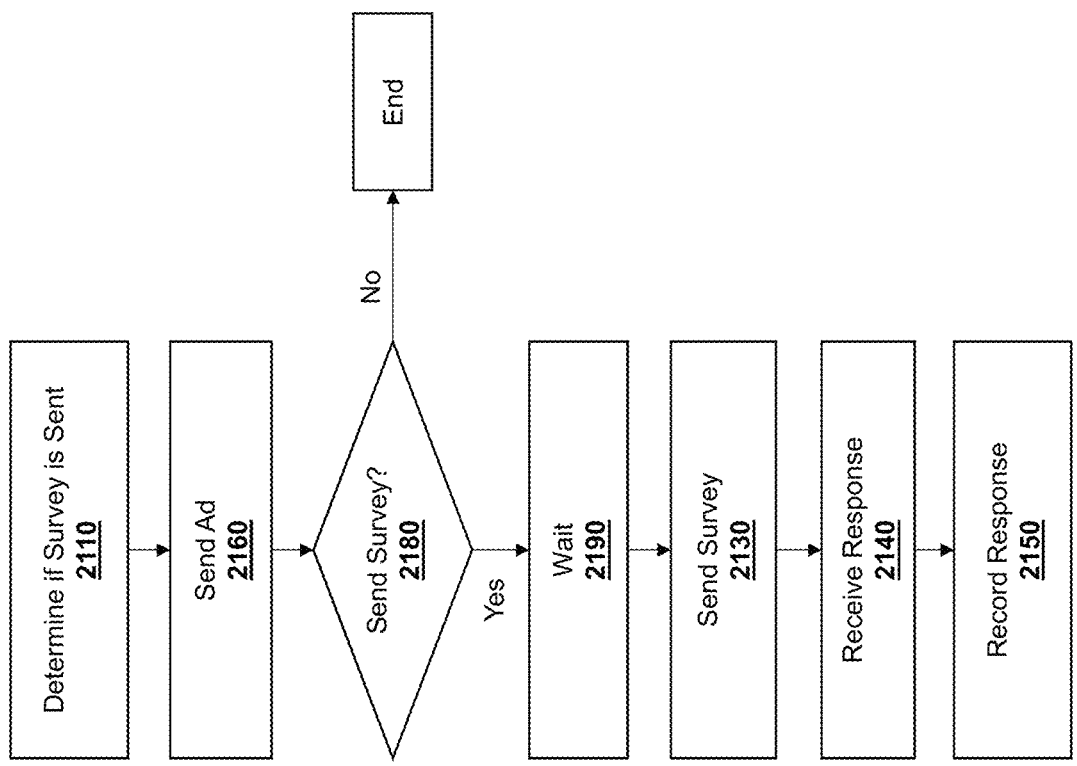
FIG. 21C is an exemplary data flow diagram illustrating an alternative embodiment of a data flow path for the survey logic of FIG. 20 where the survey logic is configured to "after-predetermined-time".

FIG. 21C illustrates another exemplary process 2040C providing an exemplary data flow of the survey logic 2040 for an "After-Predetermined-Time" survey. If this is the second time the data optimization system 1400 has received a content request from this user, the survey handler 1505 randomly determines (e.g., dice throw) whether a survey is to be sent to this user (at step 2110). Next, an ad is sent at step 2160. The survey logic 1505 tests the send survey condition at step 2180. If false end. If true, the system waits a predetermined time (e.g., immediately, 24 or 48 hours) 2190. The survey is sent at step 2130. The system waits for a response 2140. And finally, the response recorded in the profile store 1402 at step 2150.

In other embodiments, survey can include any narrative (e.g., asking for comments), and the response can be received by any channel, such as SMS, email, face to face interview, and so on. This could simply be a survey question tagged on the end of a brand ad video. Additionally and/or alternatively, the survey handler 1505 delivers a pop-up on the user's screen to display the survey.

Survey results can be consumed in any desired method, such as for example: surveys are fed into an online or offline model building process which continually reconstructs models that predict those users who are more likely to respond more positively to the survey if they were shown the brand ad.

To build the predictive models, the model builder 1422 accesses the profile store 1402 to retrieve the user's ID, any data maintained for the user associated with the user ID (e.g., demographic, environmental, etc.), the ad shown, and the associated survey response. The survey response can be translated as a dependent variable in any model built, such as a binary or real number. In the example used below, the user is sent the question: "which of the following brands will you purchase in the next 30 days? Brand A, brand B, brand C, or brand D". The response can be translated into a binary variable; TRUE if the intended brand is selected, FALSE otherwise.

To build a predictive model, sufficient data can be collected such that statistically valid patterns can be recognized in the data. Every modeling scenario will have different data requirements. As soon as sufficient data has been collected to enable a valid predictive model to be built then these models can be used to target the remaining brand ads at those users most likely to change behavior after exposure during the course of the campaign.

The actual model building technique used could be any suitable technique to predict the value of displaying an advertisement to an individual user. However, in a preferred embodiment, Uplift Modeling (where the likelihood to change behavior after exposure to the advertisement is modeled) is preferred as this will directly ensure that content is served to those where exposure is most likely to change behavior. Additional information regarding Uplift Modeling can be found in Radcliffe, N.J. (2007); *Using Control Groups to Target on Predicted Lift: Building and Assessing Uplift Models*, Direct Marketing Analytics Journal, Direct Marketing Association, which article is hereby incorporated by reference in its entirety and for all purposes.

Performance of the overall effectiveness of the campaign can be measured by comparison of positive and negative survey results between the various population groups.

The added value of the real-time optimization in the ad serving process can be measured by comparison of positive and negative survey results between those who received targeted content and those who received control. For example, the positive response rate of the exposed group divided by the positive response rate of the control group gives the basic effectiveness of the campaign.

Campaigns can be benchmarked against a variety of measures representing the industry norm for similar campaigns, performance of historical campaigns, etc.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for real-time data optimization and campaign benchmarking, the method comprising:
receiving, at an ad server, a selected content request associated with a user identifier from a user device, the received selected content request initiating an application session between the ad server and the user device;
retrieving, via the ad server, a user profile associated with the user identifier from a profile store;
determining, via a survey server in operable communication with the profile store and the ad server, whether to deliver a survey to the user device during the application session based at least on a population group associated with the retrieved user profile, the population group being defined by a predefined probability distribution, wherein the retrieved user profile further includes at least one of a location, a location history, a device history, a list of mobile applications, biographical data, a number of advertisement views, a number of retail store visits, and previous user feedback;
providing the selected content to the user device via the ad server via a first channel during the application session; and
delivering the survey to the user device during the application session if it is determined that the user profile has previously requested and received the selected content once before during another application session, said delivering the survey to the user device occurs after a predetermined time via a second channel being different than the first, wherein said determining whether to deliver a survey to the user device further comprises determining whether the user profile has previously requested and received the selected content.

2. The method of claim 1, further comprising:
building a predictive model based on all user interactions maintained in the profile store, the predictive model representing a function of independent variables and dependent variables, the independent variables representing at least a user's interaction history and the dependent variables representing one or more brand awareness scores, the one or more brand awareness scores predicting the values of survey results; and
determining a selected brand awareness score based on the generated predictive model and the retrieved user profile, and
wherein said providing the selected content to the user device is based on the determined brand awareness score, and the selected content comprising at least an advertisement portion.

3. The method of claim 1, wherein said determining whether to deliver a survey to the user device further comprises determining whether the user profile is a consumer panel member, and
wherein said delivering the survey to the user device occurs if it is determined that the user profile is associated with a consumer panel member.

4. The method of claim 1, further comprising:
receiving survey results of the delivered survey from the user device; and
updating the predictive model based on the received survey results.

5. The method of claim 2, wherein said building the predictive model is based on at least one of linear regression, logistic regression, decision tree, random forest, neural network, support vector machine, and Bayesian networks.

6. The method of claim 2, wherein said building the predictive model includes generating the independent variables that represent at least one of location, location history, device history, mobile applications, biographical data, number of advertisement views, number of retail store visits, and previous user feedback.

7. The method of claim 1, wherein said retrieving the user profile comprises obtaining at least one of mobile application usage, website page view data, device type, and location data associated with the user identifier.

8. The method of claim 1, wherein said receiving a selected content request comprises receiving a request from at least one of a web page and a mobile application.

9. The method of claim 1, further comprising assigning the retrieved user profile to a population group in the store.

10. A system for real-time data optimization and campaign benchmarking, the system comprising:
a survey server for receiving a selected content request associated with a user identifier from a user device over a data network;
an ad server in operable communication with said survey server, the selected content request initiating an application session between the ad server and the user device; and
a profile store in communication with said ad server and said survey server for maintaining a user profile associated with the user identifier,
wherein said survey server determines whether to deliver a survey to the user device during the application session based at least on a population group associated with the user profile retrieved by the ad server from the profile store, the population group being defined by a predefined probability distribution, wherein the retrieved user profile further includes at least one of a location, a location history, a device history, a list of mobile applications, biographical data, a number of advertisement views, a number of retail store visits, and previous user feedback, and said ad server provides the selected content to the user device via a first channel, wherein said survey server determines whether to deliver a survey to the user device by further determining whether the user profile has previously requested and received the selected content, and delivers the survey to the user device during the application session via a second channel being different than the first if it is determined that the user profile has previously requested and received the selected content once before, wherein said survey server delivers the survey to the user device after a predetermined time.

11. The system of claim 10, further comprising a model builder in communication with said ad server and said survey server for building a predictive model based on all user interactions maintained in the profile store, the predictive model representing a function of independent variables and dependent variables, the independent variables representing at least a user's interaction history and the dependent variables representing one or more brand awareness scores, the one or more brand awareness scores predicting the values of survey results,
wherein said ad server further comprises a model scorer for determining a selected brand awareness score based on the generated predictive model and the retrieved user profile, and provides the selected content to the user device is based on the determined brand awareness score, and the selected content comprising at least an advertisement portion.

12. The system of claim 10, wherein said survey server determines whether to deliver a survey to the user device by determining whether the user profile is a consumer panel member, and delivers the survey to the user device occurs if it is determined that the user profile is associated with a consumer panel member.

13. The system of claim 10, wherein said survey server receives survey results of the delivered survey from the user device, and said model builder updates the predictive model based on the received survey results.

14. The system of claim 11, wherein said model builder builds the predictive model based on at least one of linear regression, logistic regression, decision tree, random forest, neural network, support vector machine, and Bayesian networks.

15. The system of claim 11, wherein said model builder generates the independent variables that represent at least one of location, location history, device history, mobile applications, biographical data, number of advertisement views, number of retail store visits, and previous user feedback.

16. The system of claim 10, further comprising a brand performance exchange server in communication with the survey server over the data network for exchanging benchmark performance between one or more registered users.

* * * * *